United States Patent
Ishihara

(10) Patent No.: US 10,148,136 B2
(45) Date of Patent: Dec. 4, 2018

(54) DRIVE DEVICE, METHOD THEREOF, AND WIRELESS POWER TRANSMISSION DEVICE

(71) Applicant: KABUSHIKI KAISHA TOSHIBA, Tokyo (JP)

(72) Inventor: Hiroaki Ishihara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 300 days.

(21) Appl. No.: 15/265,559

(22) Filed: Sep. 14, 2016

(65) Prior Publication Data
US 2017/0005527 A1    Jan. 5, 2017

Related U.S. Application Data

(63) Continuation of application No. PCT/JP2014/065785, filed on Jun. 13, 2014.

(51) Int. Cl.
*H02J 50/12*   (2016.01)
*H02J 50/80*   (2016.01)
(Continued)

(52) U.S. Cl.
CPC .............. *H02J 50/80* (2016.02); *H02J 50/10* (2016.02); *H02J 50/12* (2016.02); *H02J 50/40* (2016.02);
(Continued)

(58) Field of Classification Search
USPC ........................................................ 307/104
See application file for complete search history.

(56) References Cited

U.S. PATENT DOCUMENTS 8,301,035 B2   10/2012 Harada et al.
8,508,184 B2   8/2013 Sakakibara et al.
(Continued)

FOREIGN PATENT DOCUMENTS

JP   2000-294438   10/2000
JP   2005-229783   8/2005
(Continued)

OTHER PUBLICATIONS

English-language International Search Report from the Japanese Patent Office in corresponding International Application No. PCT/JP2014/065785 dated Jul. 29, 2014.

*Primary Examiner* — Rexford Barnie
*Assistant Examiner* — Xuan Ly
(74) *Attorney, Agent, or Firm* — Finnegan, Henderson, Farabow, Garrett & Dunner, L.L.P.

(57) ABSTRACT

According to one embodiment, a drive device drives "N" number (N is an integer of "2" or greater) of inverters to generate AC power and transmit respective AC power to transmission coil units corresponding thereto and includes a switching signal generation circuit. The switching signal generation circuit generates switching signals to drive first to fourth switching elements of each inverter to complementarily drive the first switching element and the second switching element, and complementarily drive the third switching element and the fourth switching element so that a phase difference between an output current of an "M"th ("M" is an integer of 2 or greater and "N" or below) inverter and an output current of an "M−1"th inverter becomes or approach "360×L/N" degrees ("L" is an integer of "1" or greater and less than "N") and supplies the switching signals to the first to fourth switching elements of the inverters.

17 Claims, 21 Drawing Sheets

(51) Int. Cl.
*H02M 7/493* (2007.01)
*H02J 50/10* (2016.01)
*H02J 50/40* (2016.01)
*H02J 50/70* (2016.01)
*H02M 1/44* (2007.01)

(52) U.S. Cl.
CPC .............. *H02J 50/70* (2016.02); *H02M 1/44* (2013.01); *H02M 7/493* (2013.01)

(56) References Cited

U.S. PATENT DOCUMENTS

| | | |
|---|---|---|
| 8,810,071 B2 | 8/2014 | Sauerlaender et al. |
| 2012/0086281 A1* | 4/2012 | Kanno .................... H02J 5/005 307/82 |

FOREIGN PATENT DOCUMENTS

| | | |
|---|---|---|
| JP | 2010-22076 | 1/2010 |
| JP | 2010-102301 | 5/2010 |
| JP | 2011-517265 | 5/2011 |
| JP | 2012-175806 | 9/2012 |
| JP | 5139469 | 2/2013 |
| JP | 2013-219962 | 10/2013 |
| WO | WO 2012-046453 A1 | 4/2012 |
| WO | WO 2012/114822 A1 | 8/2012 |
| WO | WO 2015/037690 A1 | 3/2015 |

* cited by examiner

DRIVE DEVICE, METHOD THEREOF, AND WIRELESS POWER TRANSMISSION DEVICE

CROSS REFERENCE TO RELATED APPLICATIONS

This application is a Continuation of International Application No. PCT/JP2014/065785, filed on Jun. 13, 2014, the entire contents of which is hereby incorporated by reference.

FIELD

Embodiments described herein relate to a drive device, a method thereof, and a wireless power transmission device.

BACKGROUND

For wireless power transmission, there has been known a method of connecting two coils so as to make their generating electromagnetic fields opposite. According to the method, the electromagnetic field generated around the coils can be reduced.

However, when using a plurality of coils, many factors such as inductance of each coil, characteristics of a part connected to each coil, characteristics of a counter device to which each coil transmits power, positional relation between the counter device all need to be symmetrical in the coils, otherwise, the amplitude of the current flowing in each coil does not become the same. Further, phases of the current flowing through the coils become different and the generated electromagnetic field does not become an opposite phase. As a result, effect of reduction in a leaked electromagnetic field is limited.

DETAILED DESCRIPTION

According to one embodiment, a drive device driving "N" number (N is an integer of "2" or greater) of inverters corresponding to transmission coil units includes a switching signal generation circuit.

The inverters each includes a first switching element and a second switching element connected together at respective one ends and a third switching element and a fourth switching element connected together at respective one ends, a connection node of the first and the second switching element being connected to one end of each corresponding transmission coil unit, a connection node of the third and the fourth switching element being connected to another end of each corresponding transmission coil unit.

The inverters each generates AC power by driving the first to fourth switching elements based on a first power-supply voltage supplied to other ends of the first and third switching elements and a second power-supply voltage supplied to other ends of the second and fourth switching elements, and the inverter outputs the AC power to each corresponding transmission coil unit.

The switching signal generation circuit generates switching signals to drive the first to fourth switching elements of each inverter to complementarily drive the first switching element and the second switching element, and complementarily drive the third switching element and the fourth switching element so that a phase difference between an output current of an "M"th ("M" is an integer of 2 or greater and "N" or below) inverter and an output current of an "M−1"th inverter becomes or approach "360×L/N" degrees ("L" is an integer of "1" or greater and less than "N").

The switching signal generation circuit supplies the switching signals to the first to fourth switching elements of the inverters.

Hereinafter, embodiments of the present invention are described with reference to the drawings.

First Embodiment

Figure 1:
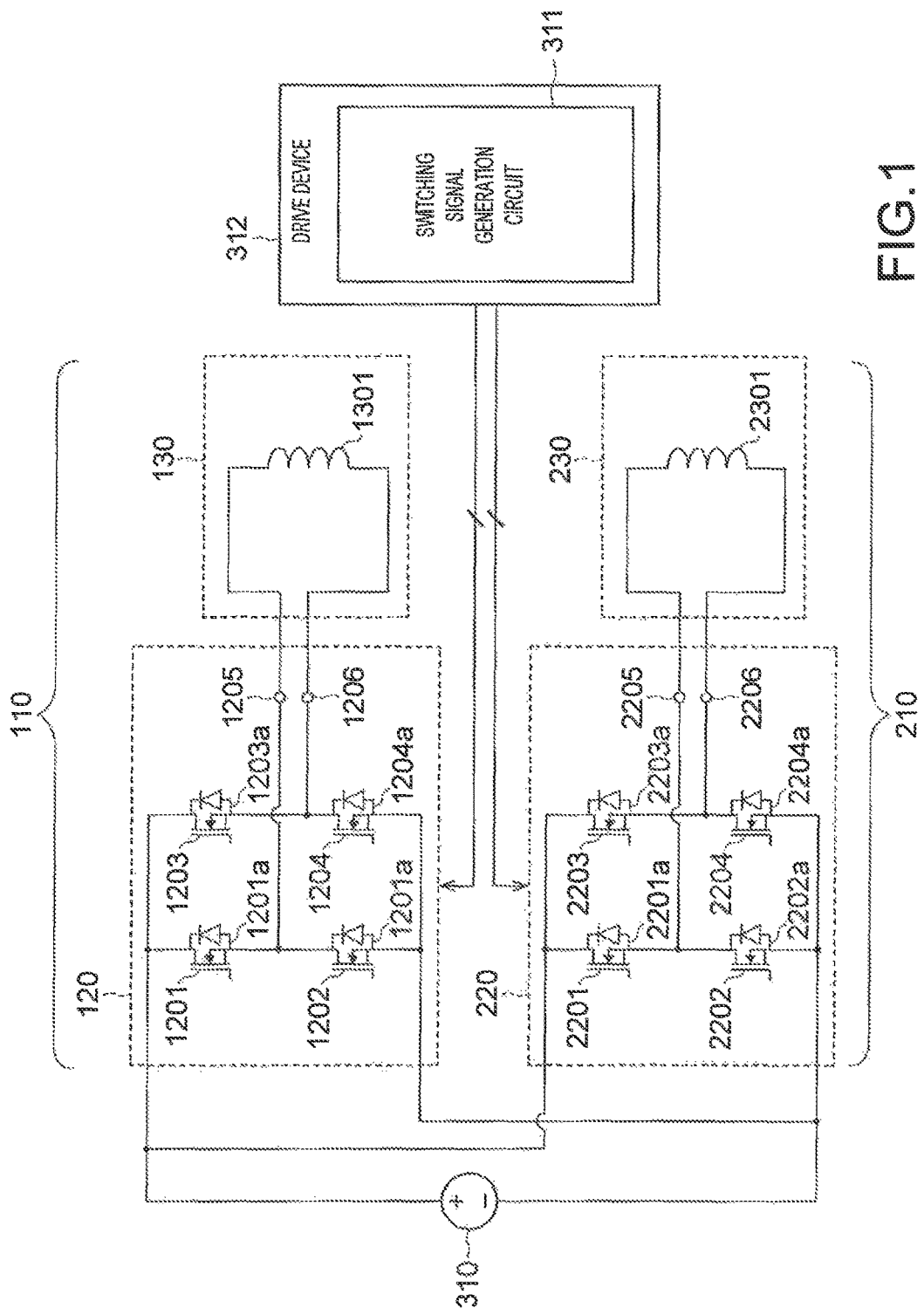
FIG. 1 shows an example of a wireless power transmission device according to the first embodiment.

FIG. 1 shows the wireless power transmission device according to the first embodiment.

The wireless power transmission device is a wireless power device (power-transmission device) of the power-transmission side including a power-transmission unit 110, power-transmission unit 210, direct-current (DC) power supply 310, and drive device 312. The wireless power transmission device wirelessly transmits power to the wireless power transmission device (power-reception device) of the power-reception side. Incidentally, although there are two power-transmission units in FIG. 1, a configuration including three or more power-transmission units may be used as described later.

The DC power supply 310 is connected to both of the power-transmission unit 110 and power-transmission unit 210 and supplies a DC power supply to both of them as a drive source. Specifically, to one end in each of the power-transmission unit 110 and power-transmission unit 210, the DC power supply 310 supplies a power-supply voltage (first power-supply voltage) and to the other end in each, the DC power supply 310 supplies a ground voltage (second power-supply voltage).

The power-transmission unit 110 includes a single-phase full-bridge inverter 120 and transmission coil unit 130. The single-phase full-bridge inverter 120 is an inverter that operates as a DC-AC converter, and includes switching elements 1201, 1202, 1203, and 1204 and diodes (reflux diodes) 1201a, 1202a, 1203a, and 1204a connected in inverse parallel to these switching elements 1201 to 1204. The "connected in inverse parallel" means that the flow direction of a current (electrical current) in each connected element is reverse (the direction of current that reversely flows to the DC power supply). The switching elements 1201, 1202, 1203, and 1204 correspond to the first, the second, the third, and the fourth switching elements respectively.

One ends of the switching elements 1201 and 1202 are mutually connected and one ends of the switching elements 1203 and 1204 are mutually connected. The other ends of the switching elements 1201 and 1203 are commonly connected to the power-supply terminal of the DC power supply 310. In this way, power supply voltage is supplied from the DC power supply 310. The other ends of the switching elements 1202 and 1204 are commonly connected to a ground terminal of the DC power supply 310, thus ground voltage is supplied from the DC power supply 310.

The connection node between the switching elements 1201 and 1202 is connected to a terminal 1205 and a connection node between the switching elements 1203 and 1204 is connected to a terminal 1206. A transmission coil unit 130 at least includes a coil 1301. One end of the transmission coil unit 130 (in this case, one end of the coil 1301) is connected to a terminal 1205 and the other end of the transmission coil unit 130 (in this case, the other end of the coil 1301) is connected to the terminal 1206. Here, the terminal 1205 corresponds to a positive output terminal and the terminal 1206 corresponds to a negative output terminal. A potential difference between the terminal 1205 and terminal 1206 corresponds to an output voltage of a single-phase full-bridge inverter 120.

The single-phase full-bridge inverter 120, based on the power-supply voltage and ground voltage supplied from the DC power supply 310, generates AC power (AC voltage or AC current) by driving each switching element according to a switching signal supplied from a drive device 312. When the switching element 1201 and switching element 1204 are on ("ON") and the switching element 1202 and switching element 1203 are off ("OFF"), a current flows to the ground side of the DC power supply 310 from the DC power supply 310 via the switching element 1201, coil 1301, and switching element 1204. When the switching element 1201 and switching element 1204 are "OFF" and the switching element 1202 and switching element 1203 are "ON", the current flows to the ground side of the DC power supply 310 from the DC power supply 310 via the switching element 1203, coil 1301, and switching element 1202. As above, by generating a current that changes its direction by controlling ON/OFF switching of each switching element, AC power is generated.

The single-phase full-bridge inverter 120 supplies the generated AC power to a transmission coil unit 130. More specifically, an output voltage applied between the terminals 1205 and 1206 and a current decided in accordance with an impedance of the transmission coil unit 130 flow, and in the coil 1301 of the transmission coil unit 130, an electromagnetic field that corresponds to the current is generated. The electromagnetic field combines with a coil on the wireless power transmission device (power-reception device) of the power-reception side and as a result, power is transmitted (see FIG. 14 described later).

Further, the power-transmission unit 210 also has the same configuration as the power-transmission unit 110. That is, the power-transmission unit 210 includes a single-phase full-bridge inverter 220 and transmission coil unit 230. The single-phase full-bridge inverter 220 includes switching elements 2201, 2202, 2203, and 2204 and diodes (reflux diodes) 2201a, 2202a, 2203a, and 2204a connected in inverse parallel to these switching elements. The switching elements 2201, 2202, 2203, and 2204 correspond to the first, the second, the third, and the fourth switching elements respectively.

One ends of the switching elements 2201 and 2202 are mutually connected and one ends of the switching elements 2203 and 2204 are mutually connected. The other ends of the switching elements 2201 and 2203 are commonly connected to the power-supply terminal of the DC power supply 310. In this way, power supply voltage is supplied from the DC power supply 310. The other ends of the switching elements 2202 and 2204 are commonly connected to a ground terminal of the DC power supply 310, thus ground voltage is supplied from the DC power supply 310.

The connection node between the switching elements 2201 and 2202 is connected to a terminal 2205 and a connection node between the switching elements 2203 and 2204 is connected to a terminal 2206. A transmission coil unit 230 at least includes a coil 2301. One end of the coil 2301 is connected to a terminal 2205 and the other end of the coil 2301 is connected to the terminal 2206.

The single-phase full-bridge inverter 220 generates AC power, based on the power-supply voltage and ground voltage, by driving each switching element according to a switching signal supplied from a drive device 312. Then, the generated AC power is supplied to the transmission coil unit 230. The coil 2301, upon receipt of the AC power from the single-phase full-bridge inverter 220, transmits power by magnetic coupling by combining with the coil on the wireless power transmission device (power-reception device) side of the power-reception side.

The drive device 312 includes a switching signal generation circuit 311 and drives a power-transmission unit 110 and power-transmission unit 210. The switching signal generation circuit 311 generates a switching signal for driving the switching elements 1201 to 1204 of the single-phase full-bridge inverter 120 and a switching signal for driving the switching elements 2201 to 2204 of the single-phase full-bridge inverter 220. Then, the switching signal generation circuit 311 supplies the generated switching signals to each switching element. These switching signals are pulse waveform signals (see such as FIG. 4 described later), and they have substantially the same duty ratio and frequency. Hereafter, switching signals supplied to the switching elements 1201 to 1204 and 2201 to 2204 may be expressed using the same reference numbers as the switching signals 1201 to 1204 and 2201 to 2204.

The switching signal generation circuit 311 generates the switching signals 1201 to 1204 in order to complimentarily drive the switching element 1201 and switching element 1202, and switching element 1203 and switching element 1204 in the single-phase full-bridge inverter 120. Also, the switching signal generation circuit 311 generates the switching signals 2201 to 2204 in order to complimentarily drive the switching element 2201 and switching element 2202, and switching element 2203 and switching element 2204 in the single-phase full-bridge inverter 220. In this way, AC power is generated in each single-phase full-bridge inverter.

Here, by adjusting the phase relation of the switching signals 1201 and 1203 in the single-phase full-bridge inverter 120, the switching signal generation circuit 311 is capable of adjusting the amplitude of the output voltage to the coil 1301. Similarly, by adjusting the phase relation of the switching signals 2201 and 2203 in the single-phase full-bridge inverter 220, the amplitude of the output voltage to the coil 2301 can be adjusted. By adjusting the amplitude of the output voltage to the coils 1301 and 2301, the amplitude of the output current to the coils 1301 and 2301 can be also adjusted. In addition, by adjusting the phase relation between the switching signal 1201 of the single-phase full-bridge inverter 120 and the switching signal 2201 of the single-phase full-bridge inverter 220, phase difference of the output voltage to the coils 1301 and 2301 are adjusted, and thus the phase difference of the output current to the coils 1301 and 2301 can be adjusted to a desired phase difference.

In the present embodiment, one of its characteristics is to reduce leakage of electromagnetic waves from the power transmission device to its surroundings using these functions to adjust amplitude of the output voltage and phase difference of the output voltage. In other words, a part of the electromagnetic field generated from the transmission coil units 130 and 230 is emitted to their surroundings and becomes a leaked electromagnetic field. The leaked electromagnetic field may affect peripheral devices of the power transmission device. Further, when there are metals around, heat may be generated due to the leaked electromagnetic field. For these reasons, the electromagnetic field that leaks to the surroundings should preferably be kept small. In order to achieve this purpose, to mutually cancel out the electromagnetic field that leaks from the transmission coil unit 130 and the electromagnetic field that leaks from the transmission coil unit 230, the amplitude and phase difference of the current in each transmission coil unit are controlled by adjusting the amplitude of the output voltage to each transmission coil unit and the phase difference of the output voltage.

When the transmission coil unit 130 and transmission coil unit 230 include a coil of the similar characteristics, by controlling each switching signal so as to make an output voltage of the single-phase full-bridge inverter 120 and single-phase full-bridge inverter 220 the same amplitude and to become the opposite phase (180 degrees) (or to make close to the opposite phase), their output currents become the same amplitude and also the opposite phases. Subsequently, it is considered that the leaked electromagnetic fields become the same amplitude and also opposite in the phases and thus the leaked electromagnetic fields are mutually cancelled. In such a case, at any point having the same distance from where the two transmission coil units are arranged and at a point far enough from the transmission coil unit relative to its size, it is expected that the leaked electromagnetic fields are mutually cancelled and become zero.

However, in reality, there may be variations in characteristics of the transmission coil unit 130 and transmission coil unit 230 and differences in the connection state to the power-reception side. In such cases, the impedance values of the transmission coil unit 130 and transmission coil unit 230 become different, and even in a case where output voltages of the single-phase full-bridge inverters 120 and 220 become the same amplitude and also opposite phases, the current supplied to the two transmission coil units and the generating electromagnetic field do not become the same. Accordingly, sufficient effect in the leaked electromagnetic field reduction cannot be expected. For this reason, in order to supply the current having the same amplitude even in such cases, output amplitudes of the two single-phase full-bridge inverters are adjusted individually. Further, when the difference in the phase components of the impedance between the transmission coil units cannot be ignored, the current phase difference does not become an opposite phase even when the phase difference of the output voltage is made to an opposite phase. Accordingly, by adjusting the phase relation of the output voltage between the single-phase full-bridge inverters so as to make the phase difference of the current to become an opposite phase, the phase difference of the output current is made to an opposite phase. In this way, reduction of leaked electromagnetic field can be achieved sufficiently even when impedance of the transmission coil unit or the difference in the phase components cannot be ignored. Details of such control of the switching signals for achieving leaked electromagnetic field are described later.

Figure 2:
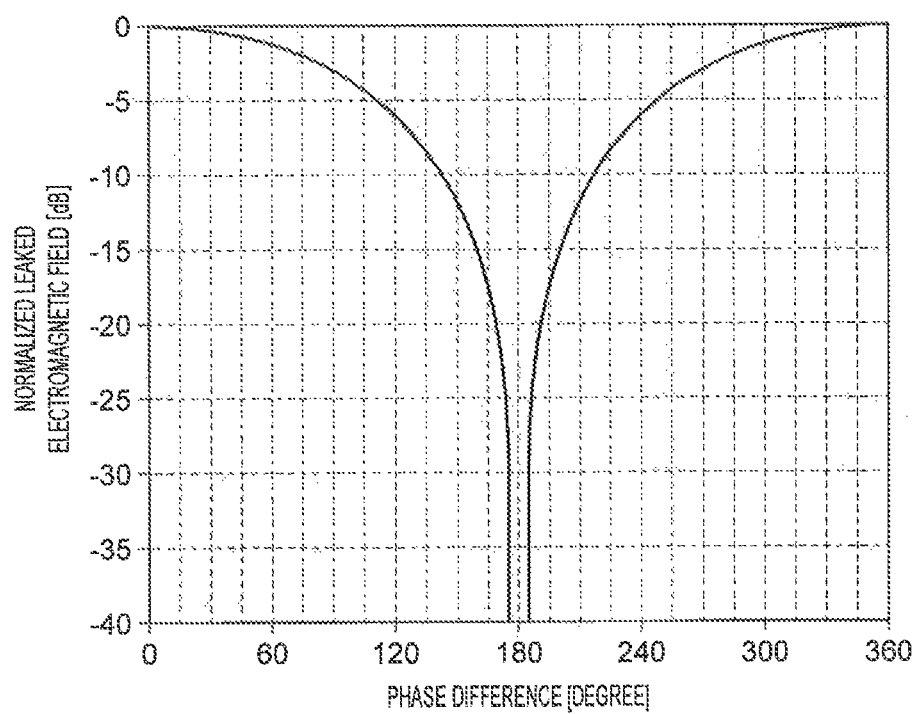
FIG. 2 shows a relationship between a phase difference and attenuation amount.

Now, the relationship between the phase difference and attenuation amount is described. FIG. 2 shows the amplitudes of the leaked electromagnetic field at a point where the distance from the two transmission coil units are the same and the relationship of the phase difference between currents of the two transmission coil units. Here, the amount of the current that flows through the two transmission coil units is considered to be the same and normalized to the values at 0 degrees. When the phase difference is 180 degrees (the opposite phase), theoretically the leaked electromagnetic field becomes "0". Even when the phase difference is in the range of 180 degrees to +/−30 degrees, the leaked electromagnetic field is −10 dB or less, which is 1/10 or less and exhibits excellent cancelling effect. Accordingly, in the following explanation, there may be used an expression of "adjusting the phase difference to 180 degrees", however, it means to approach the phase difference to 180 degrees up to a degree where sufficient cancelling effect can be obtained. Specifically, it means to adjust the phase difference within the range of +/−30 degrees to make the phase difference approach to 180 degrees. In addition, adjusting the phase difference to any phase difference X other than 180 degrees means to make the phase difference approach to a target value (phase difference X) within a range of about X degrees +/−X/6 degrees. Further, when a cancelling effect larger than 10 dB is required, the phase difference may be approached to the target value in a narrower range.

Furthermore, in the present embodiment there are two power-transmission units. However, as described in other embodiments, the present invention can be more generally extended to a case where N number (an integer of 2 or greater) of power-transmission units are included (see FIG. 15). In such cases, in order to achieve reduction in leaked electromagnetic waves, as to the phase difference between currents of the power-transmission units, the phase difference between a current of the "M"th power-transmission unit and a current of the "M–1"th power-transmission unit should be adjusted to 360×L/N degrees. "M" is an integer of 2 or greater and "N" or smaller and "L" is an integer of 1 or greater and smaller than "N".

A specific example of the switching elements 1201 to 1204, and 2201 to 2204 in FIG. 1 include semiconductor element such as FET and IGBT. FIG. 1 shows the case of the FET element. Actions of the semiconductor element are controlled by a signal supplied to a gate or base. For example, when using an N-type FET element, the semiconductor element is "ON" when the potential difference between the gate and the source is a threshold value or more, and "OFF" when the potential difference is less than the threshold value. Here, the switching signal supplied to the switching element is the signal obtained by arranging a voltage signal that makes the potential difference between the gate and the source to a threshold value or more and a voltage signal that makes the potential difference less than the threshold value at a predetermined duty ratio and frequency.

The following describes the case where the switching element becomes "ON" when the switching signal is at high level and the switching element becomes "OFF" when the switching signal is at low level. However, these may be inversed.

Figure 3:
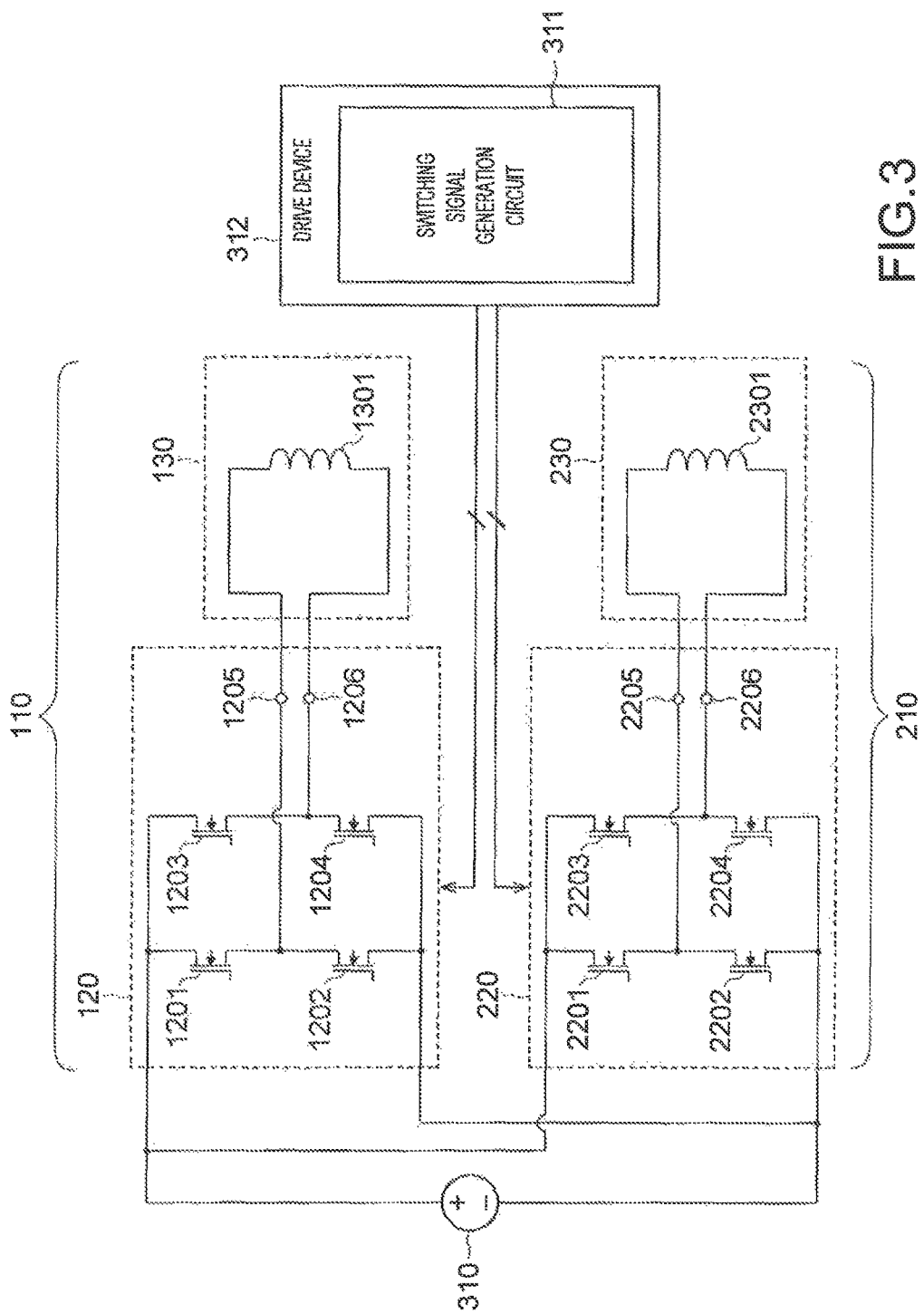
FIG. 3 shows another example of the wireless power transmission device according to the first embodiment.

In the following, the reflux diodes 1201a to 1204a, and 2201a to 2204a connected to the switching elements in the single-phase full-bridge inverters 120 and 220 are described. One role of the reflux diode is, when changing the direction of the current flowing through the coil in ON/OFF switching of each switching element (that is to inverse direction of the voltage applied to the coil), to protect each switching element. When switching ON/OFF of each switching element, due to inductance of the coil, direction of the current of the coil cannot be immediately inversed and thus a current that is inverse to the voltage applied to the coil after switching flows. When using such as an IGBT, a switching element to which large current cannot be inversely flowed, by flowing the current to the reflux diode connected in inverse parallel to the switching element, an inverse current flows to each switching element and thus prevents occurrence of damage and destruction of the element. Also, when using the switching signal including dead time described later, a period in which all the switching elements become "OFF" is generated during switching of the switching elements. In the case, by flowing the coil current to the reflux diode, occurrence of damage and destruction of the switching element can be prevented. Incidentally, the connecting position of the reflux diode is not limited to the positions in FIG. 1 and may be changed according to the type of switching element to be used. The reflux diode is not essential in the point to exhibit functions of the present embodiment. Accordingly, as shown in FIG. 3, a configuration not connecting the reflux diode may be used.

Figure 4:
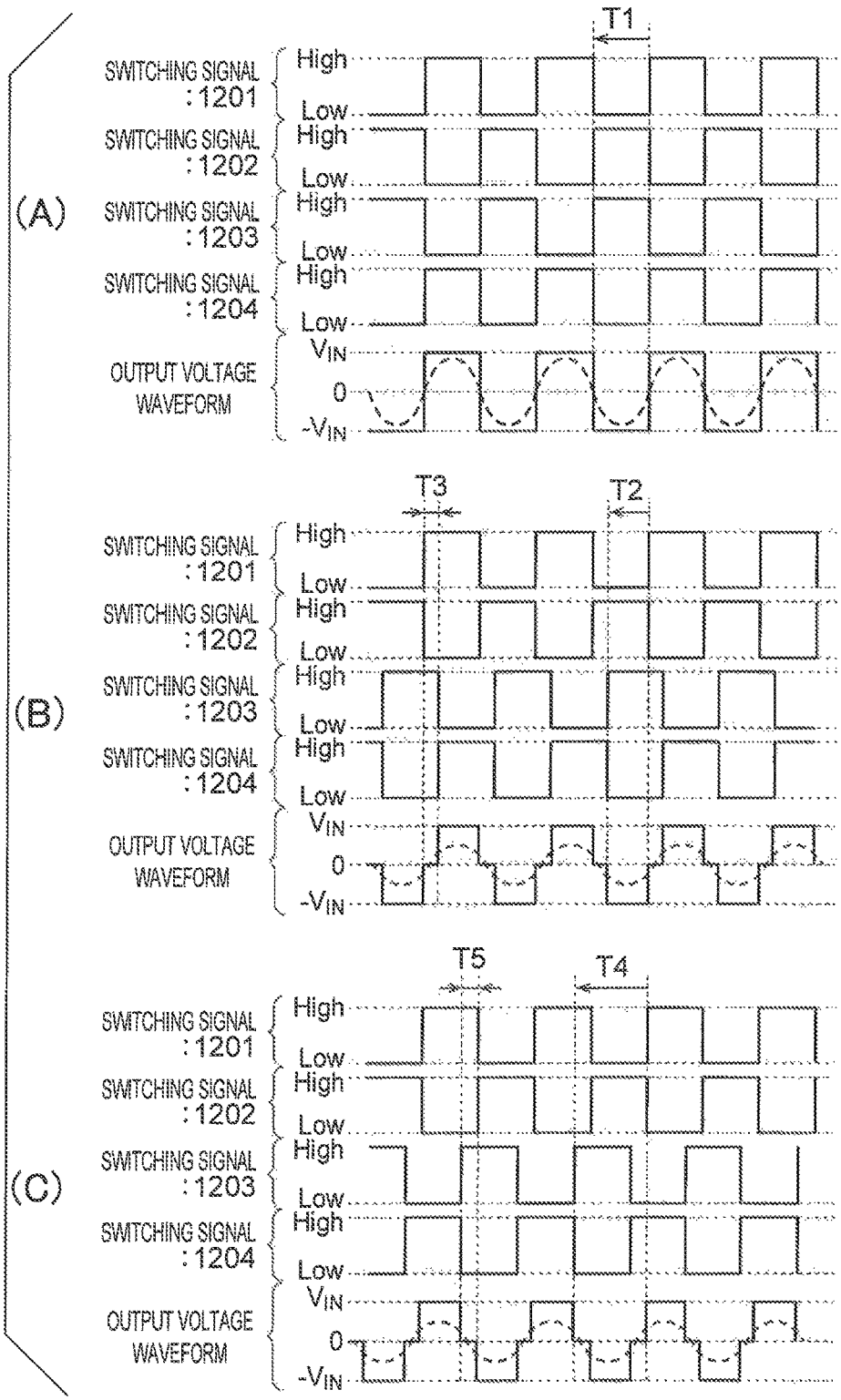
FIG. 4 shows examples of switching signals and an output waveform according to the first embodiment.

The following describes, using FIG. 4, a relationship between the switching signals 1201 to 1204 supplied to the switching elements 1201 to 1204 of the single-phase full-bridge inverter 120 and the waveform of the output voltage from the single-phase full-bridge inverter 120.

FIG. 4(A), FIG. 4(B), and FIG. 4(C) show relationships of the switching signal and output voltage waveforms for the single-phase full-bridge inverter 120. In the following description, voltage $V_{IN}$ input from the DC power supply 310 is constant. A frequency for transmission is $f_0$ [Hz]. In other words, the cycle of the transmission frequency is $t_0=1/f_0$ [sec.]. The switching signals supplied to the four switching elements all have the same duty ratio and are the pulse signals having the same cycle $t_0$. In FIG. 4(A) to FIG. 4(C), the duty ratio for the switching signals 1201 to 1204 is 50%.

FIG. 4(A) is an example where the switching signals 1201 to 1204 are set so that a fundamental wave component of the output voltage of the single-phase full-bridge inverter 120 becomes the maximum. In FIG. 4(A), the switching signal 1202 has a phase difference (phase lead) of 180 degrees relative to the switching signal 1201.

Now, the phase difference is described. The phase difference means a time difference of the waveform between periodic signals. Phase lead of "P" degrees is equivalent to a time leading of $P/360 \times t_0$ for the periodic signal having a cycle "$t_0$". Also, in the case of periodic waveform, when 360-degrees phase shift is performed, the waveform becomes the same. For this reason, phase lead of "P" degrees is equivalent to phase delay of "360–P" degrees. In the following explanation, expressions of "phase lead" and "phase delay" are used to explain the waveforms for convenience. However, converting from phase delay to phase lead, and from phase lead to phase delay by phase shifting by 360 degrees are equivalent. Further, in the description, waveforms may be expressed in negative phase lead or negative phase delay. However, by using an absolute value, they can be considered as expressing the waveforms equivalent to the waveforms expressed as positive phase delay or lead. In other words, to any "P", phase delay of "P" degrees is defined to be equivalent to the phase lead of "–P" degrees, and the phase lead of "P" degrees is defined to be equivalent to the phase delay of "–P" degrees.

The switching signal 1203 has 180-degrees phase lead (T1 in FIG. 4(A)) to the switching signal 1201. The switching signal 1204 has 180-degrees phase lead to the switching signal 1203. In other words, although the switching signal 1204 has 360-degrees phase lead to the switching signal 1201, the 360-degrees phase lead indicates a shift of time waveform for the amount of 1 cycle, and thus equivalent to the 0-degrees phase lead with respect to the periodic signal. Accordingly, the switching signal 1201 is the same waveform as the switching signal 1204.

When the switching signals 1201 to 1204 are in such phase relations, as shown in FIG. 4(A), the output voltage of the single-phase full-bridge inverter 120 becomes a rectangular waveform. In the figure, the broken-line waveform shown overlapping to the rectangular waveform represents a fundamental wave component of the output voltage. The fundamental wave component can be defined as the component of the frequency $f_0$ for the waveform of the output voltage. The fundamental wave component can be obtained by performing frequency resolution of the signal of the output voltage and extracting only the fundamental wave component.

FIG. 4(B) is, when compared to FIG. 4(A), an example for setting the amplitude of the fundamental wave component of the output voltage low. As in FIG. 4(A), the switching signal 1202 has 180-degrees phase lead to the switching signal 1201. The switching signal 1203 has "180–$P_1$" degrees phase lead (T2 in FIG. 4(B)) to the switching signal 1201. $P_1$ is set to $P_1>0$. The switching signal 1204 has 180-degrees phase lead to the switching signal 1203. Here, to the output voltage waveform, a period in which the output voltage becomes "0" (T3 in FIG. 4(B)) is inserted only by "$t_0 \times P_1/360$" seconds per 1 cycle as shown in FIG. 4(B). In this way, the amplitude of the fundamental wave component of the output voltage becomes small compared to the case shown in FIG. 4(A).

FIG. 4(C) is, like FIG. 4(B), is another example for setting the amplitude of the fundamental wave component of the output voltage low compared to FIG. 4(A). In FIG. 4(B), a positive value was used for $P_1$. However, FIG. 4(C) is the case where a negative value is used. The switching signal 1203 has "180–$P_1$"-degrees phase lead (T4 in FIG. 4(C)) to the switching signal 1201. $P_1$ is set to $P_1<0$. Also in the case, a period in which the output voltage becomes "0" (T5 in FIG. 4(C)) is inserted to the output voltage waveform only by "$t_0\times|P_1|/360$" seconds per 1 cycle. In this way, the amplitude of the fundamental wave component of the output voltage becomes small compared to FIG. 4(A).

As above, the magnitude of the fundamental wave component of the output voltage is determined by $P_1$. Any $P_1$ can be expressed within the range of –180 degrees to 180 degrees. To $P_1$ that is out of this range, by phase shifting by 360 degrees times an integer, $P_1$ can be changed to become within the range. When $P_1$ is expressed within the range of –180 degrees to 180 degrees, as $|P_1|$ becomes small, the fundamental wave component of the output voltage becomes large, and as $|P_1|$ becomes large, the fundamental wave component of the output voltage becomes small. In other words, by adjusting the value of $P_1$, the amplitude of the fundamental wave component for the output voltage can be adjusted. FIG. 4(A) corresponds to the case where $P_1$ is "0" degrees. Incidentally, when $P_1$ is –180 degrees or 180 degrees, ideally, the output voltage always becomes zero.

In the following, $P_1$ is expressed within the range of –180 degrees to 180 degrees, and $P_1$ is called as an "amplitude adjustment parameter".

In the above explanation, typically, an example of output amplitude adjustment to the fundamental wave which is a frequency component having the maximum amplitude in the output voltage is shown. However, output of the single-phase full-bridge inverter includes harmonic wave component of the fundamental wave in addition to the fundamental wave component. Also to the harmonic wave component, control of amplitude is possible by similarly adjusting $|P_1|$.

In FIG. 4(A) to FIG. 4(C), a case where a duty ratio of the switching signal is 50% is shown. In such case, when variations in the timing for the switching signals are generated, the switching element 1201 and switching element 1202 may simultaneously become "ON" and the switching element 1203 and switching element 1204 may simultaneously become "ON". In such cases, output of the DC power supply 310 is short-circuited and a large current may be generated. Accordingly, by making the duty ratio less than 50%, a method of more safely preventing the switching elements from becoming simultaneously "ON" is shown.

Figure 5:
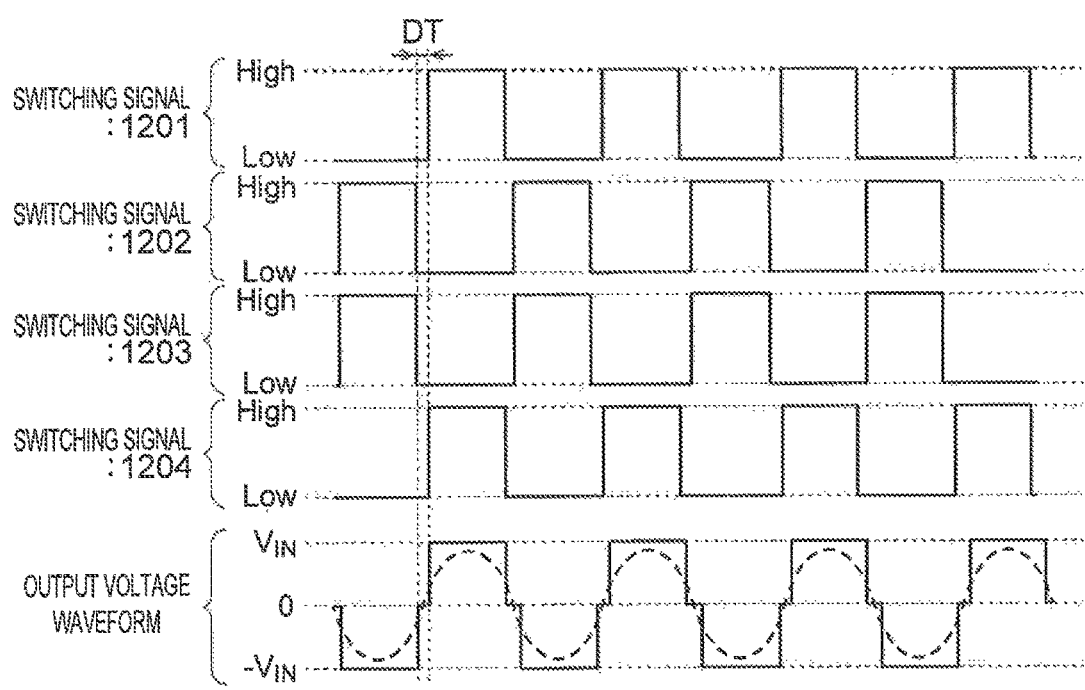
FIG. 5 shows an example of a waveform when there is dead time between the switching signals.

In FIG. 5, an example of the waveforms of each switching signal and output voltage when the duty ratio is less than 50% is shown. By making the duty ratio less than 50%, between the switching signal 1201 and switching signal 1202, and between the switching signal 1203 and switching signal 1204, the dead time DT where both of their levels become a low level can be set. In this way, even when variations in the timing for the switching signals are generated, turning the switching elements simultaneously "ON" can be prevented. As above, even for the case where the dead time DT is set, by setting the phase difference $P_1$ which becomes a longer time difference than the dead time, like in FIG. 4, amplitude of the fundamental wave component of the output voltage can be controlled.

In the above, using the single-phase full-bridge inverter 120 as an example, the relationships between the switching signals 1201 to 1204 and output voltage waveform are explained. Also for the single-phase full-bridge inverter 220, like the single-phase full-bridge inverter 120, amplitude of the output voltage can be controlled. Also to the single-phase full-bridge inverter 220, like $P_1$ in the single-phase full-bridge inverter 120, amplitude adjustment parameter can be defined and the parameter is shown as $P_2$. In other words, the output amplitude of the single-phase full-bridge inverter 220 can be controlled with $P_2$ using $|P_2|$.

From the above, the output amplitudes of the single-phase full-bridge inverters 120 and 220 can be individually controlled by adjusting $|P_1|$ and $|P_2|$ for each. Subsequently, even when impedance of the transmission coil unit 130 and 230 differ, the output current of the same amplitude can be generated, and thus leaked electromagnetic field having the same amplitude can be generated.

On the other hand, as described above, in order to cancel out the leaked magnetic field, the phase of the leaked electromagnetic field output from each single-phase full bridge inverter needs to be inverted to an opposite phase (180 degrees). That is, to each transmission coil unit, a current of an opposite phase needs to be flowed. Between the transmission coil units, when the difference of phase components of impedance is small enough to be ignored, the two single-phase full-bridge inverters only need to be driven in an opposite phase (make the phase difference of the output voltage 180 degrees between the two single-phase full-bridge Inverters). In this case, as the phase difference of the current also becomes an opposite phase, the leaked electromagnetic field also becomes an opposite phase.

Figure 6:
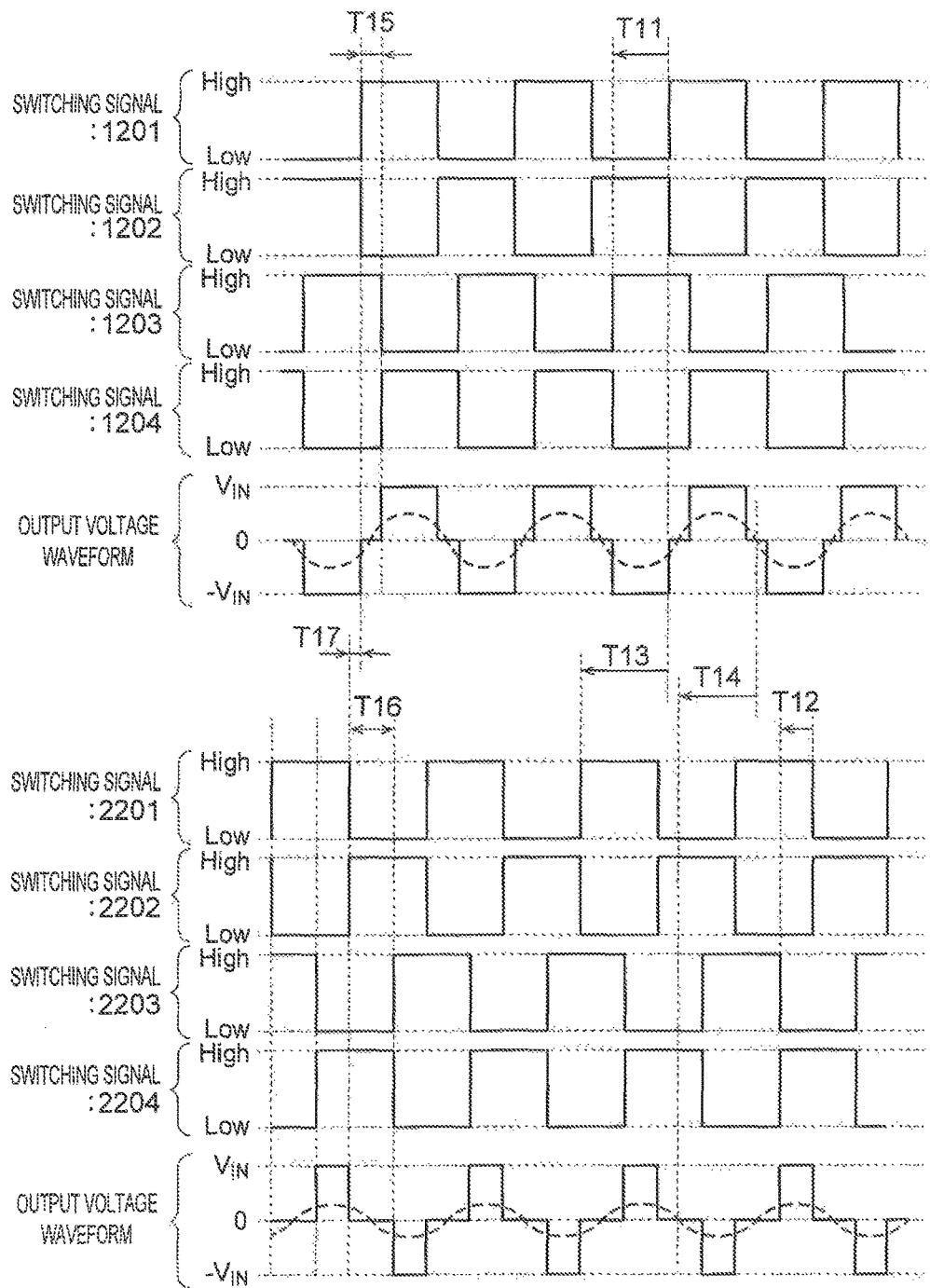
FIG. 6 shows other examples of the switching signals and output waveform according to the first embodiment.

In FIG. 6, examples of the switching signal and output voltage waveforms when adjusting the phase difference of the output voltage to 180 degrees between two single-phase full-bridge inverter are shown.

An amplitude adjustment parameter for the single-phase full-bridge inverter 120 is given as $P_1$, and an amplitude adjustment parameter for the single-phase full-bridge inverter 220 is given as $P_2$. In FIG. 6, $P_1>0$, $P_2>0$, $P_1<P_2$. However, waveform can be similarly defined to any $P_1$ and $P_2$ combinations.

In each pair of the switching signals 1201 and 1202, 1203 and 1204, 2201 and 2202, and 2203 and 2204, there are 180-degrees phase differences. The switching signal 1203 has phase lead (T11) of "180–$P_1$" degrees to the switching signal 1201, and the switching signal 2203 has phase lead (T12) of "180–$P_2$" degrees to the switching signal 2201.

Further, the switching signal 2201 has phase lead (T13) of "180–0.5($P_1-P_2$)" degrees to the switching signal 1201. In the figure, T17 represents the period of difference between the phase lead "1.80–0.5($P_1-P_2$)" degrees and 180 degrees and its length is "$0.5\times t_0\times|P_1-P_2|/360$" seconds.

To any $P_1$ and $P_2$, by providing the switching signals set for such phase relation, a desired amplitude can be obtained while using the fundamental wave component of the output voltage of the two single-phase full-bridge inverter as an opposite phase (T14). Incidentally, T15 represents a period where the output voltage of the single-phase full-bridge inverter 120 becomes "0", and its length is "$t_0\times|P_1|/360$" seconds. T16 represents a period where the output voltage of the single-phase full-bridge inverter 220 becomes "0", and its length is "$t_0\times|P_2|/360$" seconds.

When difference of the phase components of impedance between transmission coil units cannot be ignored at this point, even when the phase difference of the output voltage is made to an opposite phase, the difference of the current phase does not become an opposite phase so that the phase difference of the leaked electromagnetic field does not become an opposite phase and the effect in leaked magnetic field reduction reduces. For this reason, to make the phase difference of the current an opposite phase, appropriately setting the phase difference of the output voltage between the single-phase full-bridge inverters and making the phase of the leaked electromagnetic field an opposite phase are preferable.

For the case, the switching signal 2201 should be adjusted to have phase lead of "$PP_1-0.5(P_1-P_2)$" degrees relative to the switching signal 1201. For other switching signals 2202 to 2204 and 1202 to 1204, the same relationship should be maintained relative to the switching signal 2201 and switching signal 1201 respectively. Here, $PP_1$ represents the current phases of the two transmission coil units, in other words, the phase difference between the output voltages of the single-phase full-bridge inverter 120 and single-phase full-bridge Inverter 220 where the phases of the leaked electromagnetic fields generated by the two transmission coil units become opposite phases, "$PP_1$" is called "a current phase adjustment parameter".

Figure 7:
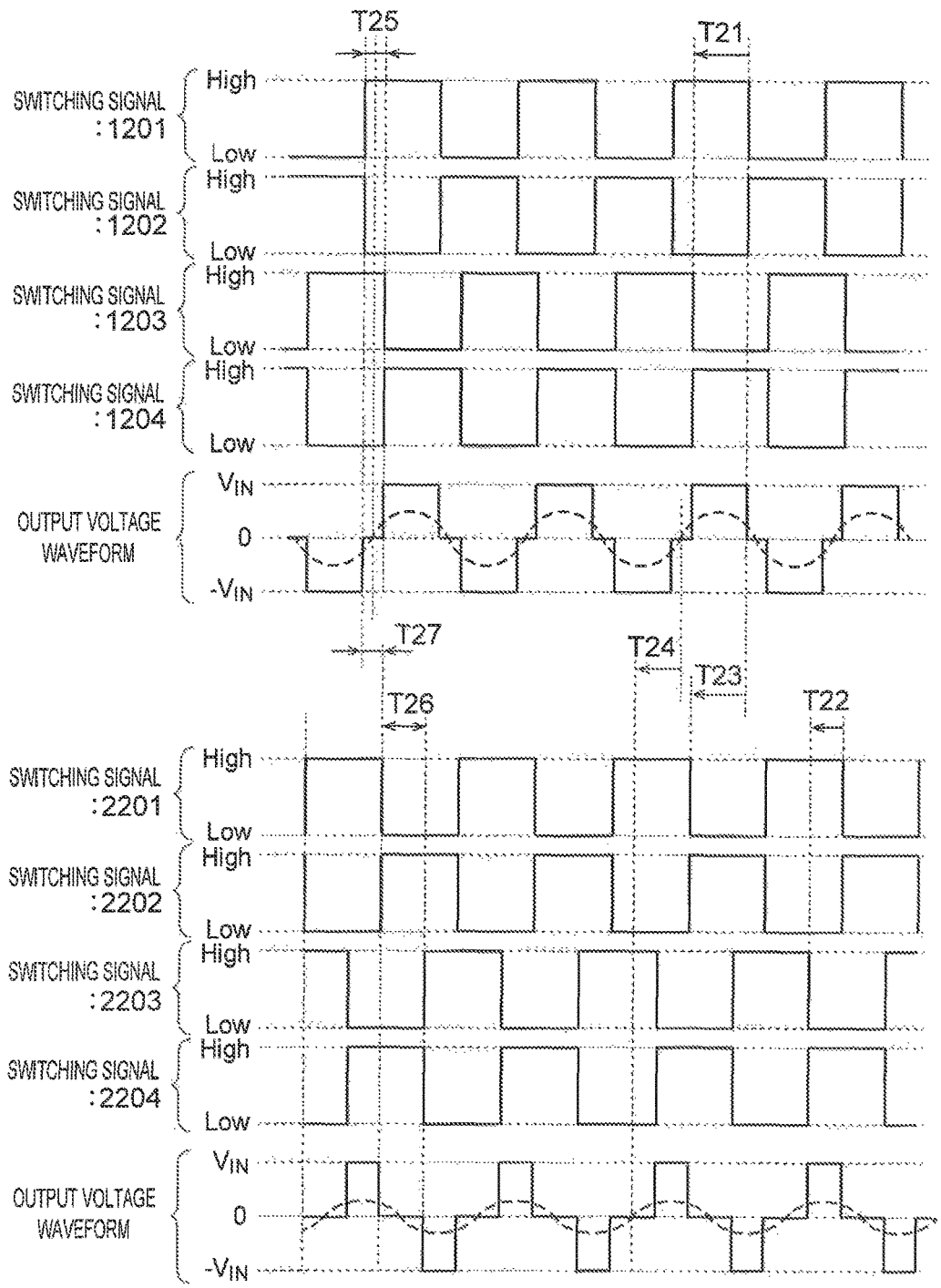
FIG. 7 shows other examples of the switching signals and output waveform according to the first embodiment.

In FIG. 7, an example of the waveforms of the switching signal and output voltage when the phase difference of the output voltages is set to $PP_1$ degrees between the two single-phase full-bridge inverters. The example shown in FIG. 6 before corresponds to the case where $PP_1=180$ degrees.

In FIG. 7, the switching signal 1203 has the phase lead (T21) of "$180-P_1$" degrees relative to the switching signal 1201. The switching signal 2203 has the phase lead (T22) of "$180-P_2$" degrees relative to the switching signal 2201.

Further, the switching signal 2201 has phase lead (T23) of "$PP_1-0.5(P_1-P_2)$" degrees relative to the switching signal 1201. To any $P_1$ and $P_2$, by providing a switching signal set to such phase relation, a desired amplitude can be obtained while making the phase difference between the fundamental wave components of the output voltages of the two single-phase full-bridge inverters to $PP_1$ degrees (T24). In addition, T25 represents a period where the output voltage of the single-phase full-bridge inverter 120 becomes "0" and its length is "$t_0 \times |P_1|/360$" seconds. T26 represents a period where the output voltage of the single-phase full-bridge inverter 220 becomes "0" and its length is "$t_0 \times |P_2|/360$" seconds. T27 represents a period of difference between the period of T23 and 180 degrees, and its length is $t_0 \times |PP_1-180+0.5|P_1-P_2||/360$ seconds.

Now, cases where it becomes effective to adjust the phase difference of the output voltage to 180 degrees and to degrees other than 180 degrees are specifically described. Also, when adjusting to degrees other than 180 degrees, specifically to what value the phase difference of the output voltage should be set is described.

Figure 8:
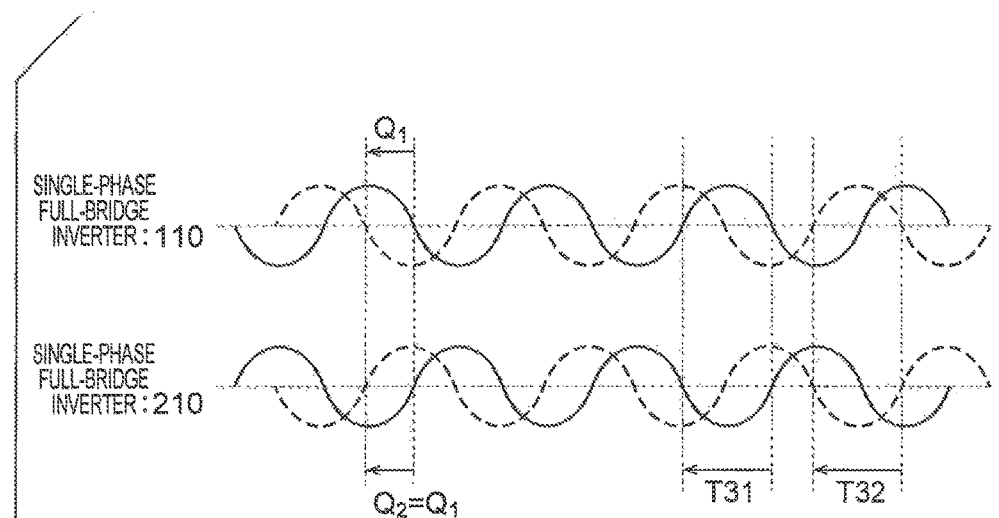
FIG. 8 are examples showing each of when the phase difference of the voltage waveform is adjusted to 180 degrees and other degrees.
Figure 8:
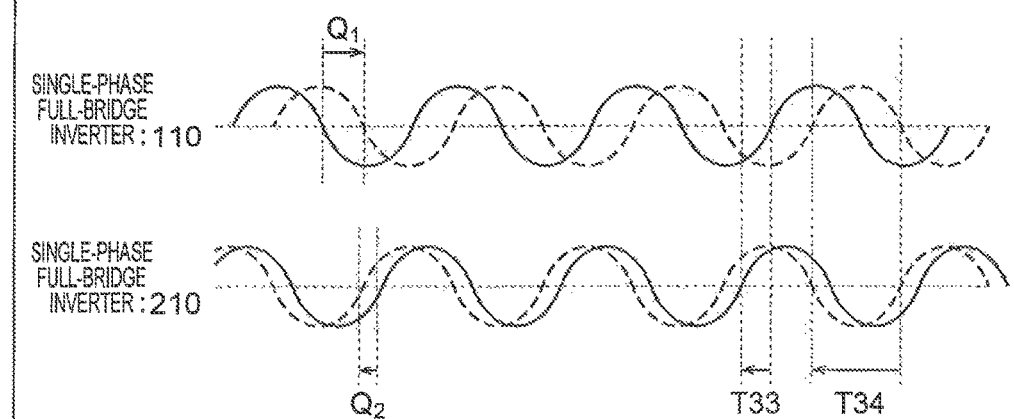

In FIG. 8(A), a case where the phase lead $Q_1$ of the output current relative to the output voltage of the single-phase full-bridge inverter 120 and the phase lead $Q_2$ of the output current relative to the output voltage of the single-phase full-bridge inverter 220 are substantially the same. The solid line represents a fundamental wave component of the voltage and a broken line represents a fundamental wave component of the current. In this case, by adjusting the phase difference of the fundamental wave component of the voltage of the single-phase full-bridge inverter 220 relative to the fundamental wave component of the voltage of the single-phase full-bridge inverter 120 to 180 degrees (T31), the current phase difference also becomes approximately 180-degrees phase difference (T32). Accordingly, effective effect of leaked electromagnetic field can be expected.

In FIG. 8(B), a case where the phase lead $Q_1$ of the output current relative to the output voltage of the single-phase full-bridge inverter 120 and the phase lead $Q_2$ of the output current relative to the output voltage of the single-phase full-bridge inverter 220 are different is shown. When $Q_1$ and $Q_2$ are different, by setting the phase difference of the fundamental wave component of the voltage of the single-phase full-bridge inverter 220 relative to the fundamental wave component of the voltage of the single-phase full-bridge inverter 120 to the phase difference of other than 180 degrees, that is the phase lead (T33) of $180+Q_1-Q_2$ degrees, the current waveform becomes an opposite phase (T34) and a great effect in the leaked electromagnetic field reduction can be expected. Further, in FIG. 8(B), $Q_1<0$ and $Q_2>0$ and includes the waveform when the phase lead $Q_1$ is negative. However, as defined in the above, it is equivalent to the phase delay of $Q_1$ degrees. Also, similar explanation can be made for examples with $Q_1$ and $Q_2$ of any sign and any value other than the one shown in FIG. 8(B).

Further, a coil that corresponds to either of the two single-phase full-bridge inverters may be arranged so as to generate an electromagnetic field having an opposite direction relative to the output current direction from the single-phase full-bridge inverter. In such a case, as a great cancelling effect can be obtained for the current of the phase difference at 0 degrees between the single-phase full-bridge inverters, $PP_1$ should be adjusted to 0 degrees or around (that is a value taking into account $Q_1$ and $Q_2$). Such arrangement is possible by, in a case of a spiral-type or solenoidal-type coil, changing the direction of the winding wire to the opposite direction.

Figure 9:
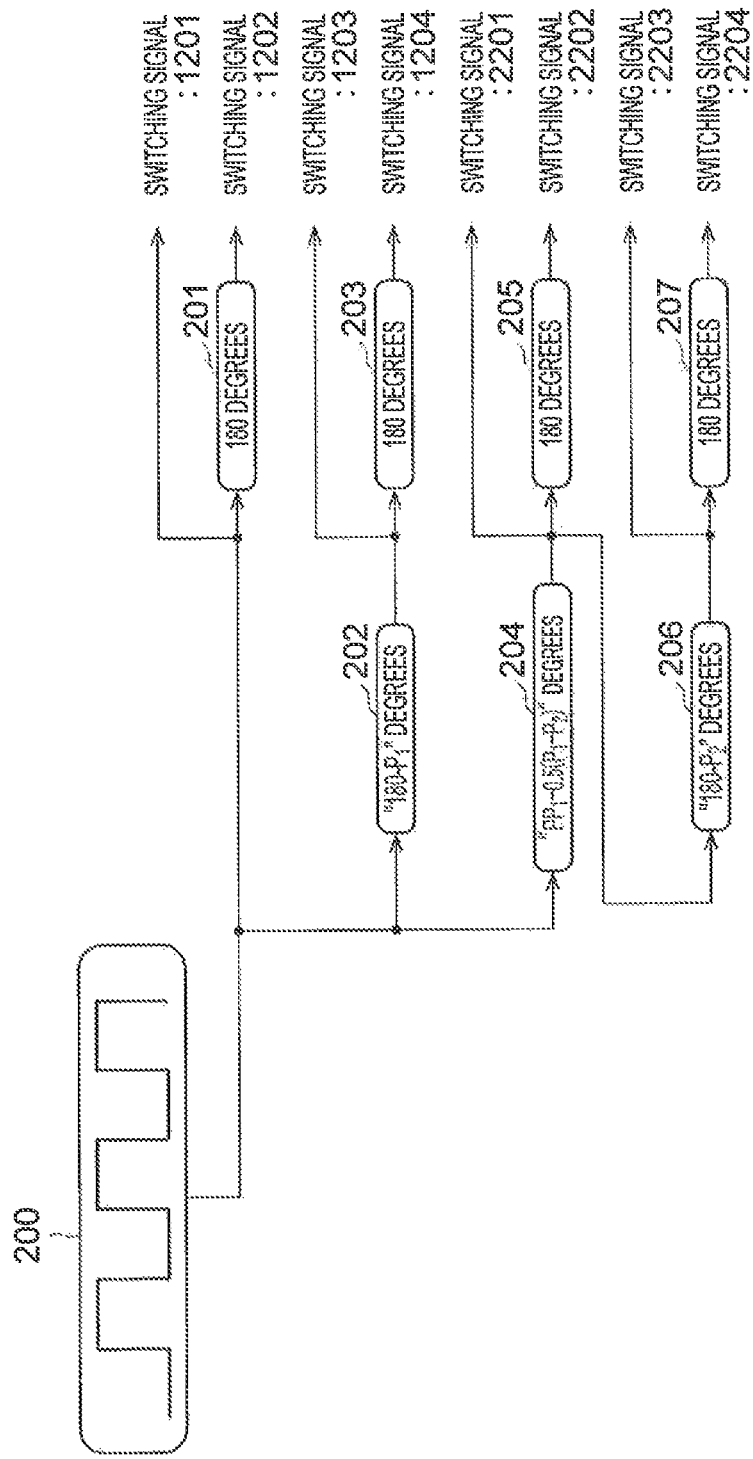
FIG. 9 shows the first example of a switching signal generation circuit.

FIG. 9 shows a configuration example of a switching signal generation circuit 311. The switching signal generation circuit 311 includes phase shifters 201 to 207. The switching signals 1201 to 1204 and 2201 to 2204 are generated from the reference signal using the phase shifters. The reference signal 200 is a pulse signal having the same duty ratio and the same frequency as those of other switching signals. The reference signal 200 can be generated by using such as phase-locked loop (PPL). The switching signal generation circuit 311 may include a signal generation circuit that generates the reference signal 200.

The switching signal 1201 uses the reference signal 200 as it is. The switching signal 1202 has the phase lead of 180 degrees relative to the switching signal 1201 so that it can be generated by providing phase lead (phase difference) of 180 degrees to the reference signal by the phase shifter 201. The switching signal 1203 has the phase lead of "$180-P_1$" degrees relative to the switching signal 1201 so that by providing the phase lead by the phase shifter 202 the switching signal 1203 can be generated. The switching signal 1204 has the phase lead of 180 degrees relative to the switching signal 1203 so that by providing the phase lead of 180 degrees to the switching signal 1203 by the phase shifter 203, the switching signal 1204 can be generated.

The switching signal 2201 has the phase lead of ($PP_1-0.5(P_1-P_2)$) degrees relative to the switching signal 1201 so that it can be generated by providing the phase lead to the switching signal 1201 by the phase shifter 204. The switching signal 2202 has the phase lead of 180 degrees relative to the switching signal 2201 so that it can be generated by providing the phase lead of 180 degrees to the switching signal 2201 by the phase shifter 205. The switching signal 2203 has the phase lead of "$180-P_2$" degrees relative to the switching signal 2201 so that it can be generated by providing the phase lead to the switching signal 2201 by the phase shifter 206. The switching signal 2204 has the phase lead of 180 degrees relative to the switching signal 2203 so that it can be generated by providing the phase lead of 180 degrees to the switching signal 203 by the phase shifter 207.

Here, "providing the phase lead of "R" degrees" means the same as providing the phase delay of "360–R" degrees. For this reason, each phase shifter can be configured in either way to provide phase delay or phase lead.

Further, the phase shifter may include a delay device providing the similar effect. The phase shifter providing the phase lead of "R" degrees is equivalent to the phase delay of "360–R" degrees. Accordingly, the phase shifter providing the phase lead of "R" degrees can be replaced by a delay device which generates a delay of $t_0 \times (360-R)/360$ seconds to the cycle $t_0$.

Further, in a case of a waveform having 50% duty, the 180-degrees phase shifter may be configured from an inverter that reverses between a high level and low level.

Figure 10:
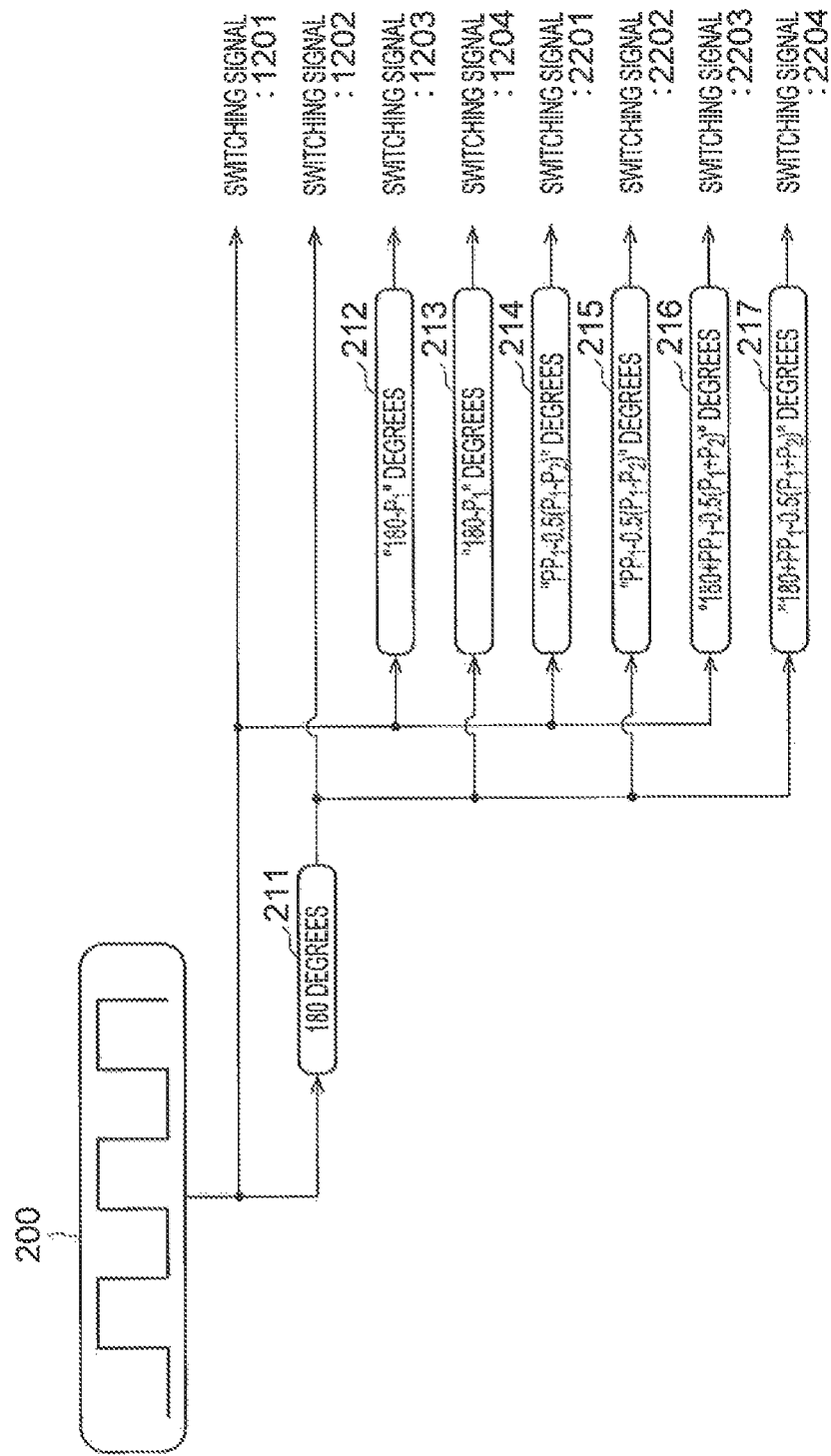
FIG. 10 shows the second example of the switching signal generation circuit.

FIG. 10 shows another configuration example of the switching signal generation circuit 311. The switching signal generation circuit 311 includes the phase shifters 211 to 217. The switching signal 1201 uses the reference signal 200 as it is. The switching signal 1202 is generated by providing 180-degrees phase lead to the reference signal 200 by the phase shifter 211. Other switching signals 1203, 1204, and 2201 to 2204 can be generated by providing phase lead for the corresponding phase lead amount to these two switching signals 1201 and 1202 by the phase shifter 212 to 217. In other words, the switching signals 1203 and 1204 are generated by providing 180-degrees phase lead to the switching signals 1201 and 1202 by the phase shifter 212 and 213. The switching signal 2201 and 2202 are generated by providing the phase lead of "$PP_1 - 0.5(P_1 - P_2)$" degrees to the switching signals 1201 and 1202 by the phase shifters 214 and 215. The switching signals 2203 and 2204 are generated by providing the phase lead of "$180 + PP_1 - 0.5(P_1 + P_2)$" degrees to the switching signals 1201 and 1202 by the phase shifter 216 and 217.

Figure 11:
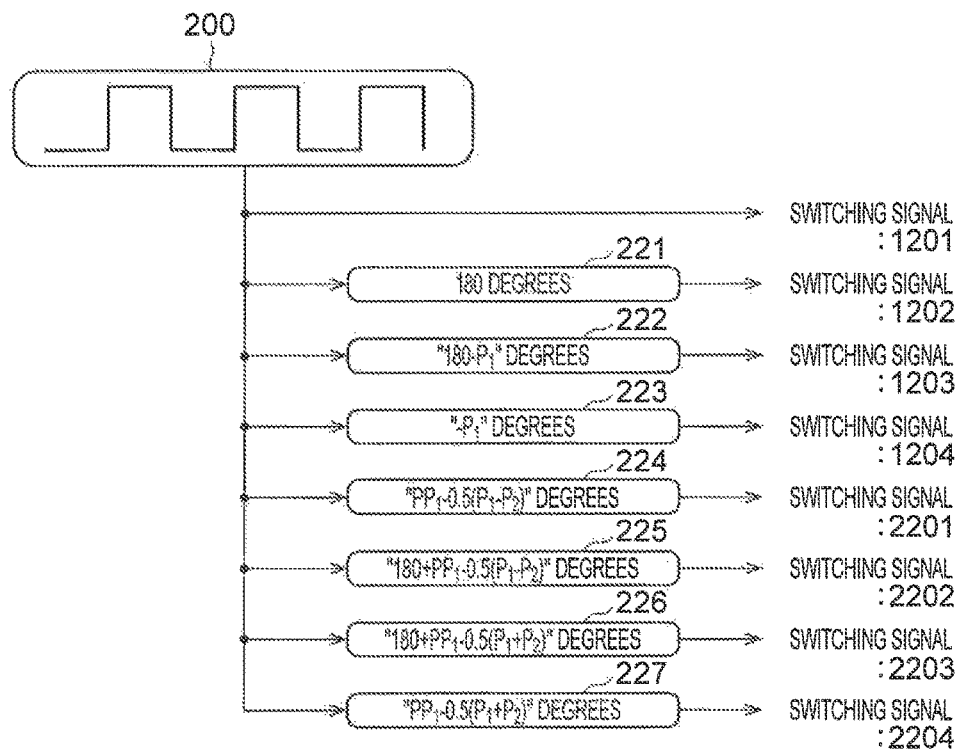
FIG. 11 shows the third example of the switching signal generation circuit.

FIG. 11 further shows another configuration example of the switching signal generation circuit 311. The switching signal generation circuit 311 includes the phase shifters 221 to 227. The switching signal 1201 uses the reference signal 200 as it is. Other switching signals 1202 to 1204, and 2201 to 2204 are generated by providing corresponding phase lead to the switching signal 1201 by each of the phase shifters 221 to 227. In other words, the switching signal 1202 is generated by providing 180-degrees phase lead to the switching signal 1201 by the phase shifter 221. The switching signal 1203 is generated by providing the phase lead of "$180-P_1$" degrees to the switching signal 1201 by the phase shifter 222. The switching signal 1204 is generated by providing the phase lead of "$-P_1$" degrees to the switching signal 1201 by the phase shifter 223. The switching signal 2201 is generated by providing the phase lead of "$PP_1 - 0.5(P_1 - P_2)$" degrees to the switching signal 1201 by the phase shifter 224. The switching signal 2202 is generated by providing the phase lead of "$180 + PP_1 - 0.5(P_1 - P_2)$" degrees to the switching signal 1201 by the phase shifter 225. The switching signal 2203 is generated by providing the phase lead of "$180 + PP_1 - 0.5(P_1 + P_2)$" degrees to the switching signal 1201 by the phase shifter 226. The switching signal 2204 is generated by providing the phase lead of "$PP_1 - 0.5(P_1 + P_2)$" degrees to the switching signal 1201 by the phase shifter 227.

Any other configuration generating a switching signal can be used as long as the switching signal combinations that satisfy a predetermined phase relation are obtained.

The transmission coil unit 130 and transmission coil unit 230 shown in FIG. 1 include the coil 1301 and coil 2301 respectively, however, other elements may be included to the transmission unit. FIG. 12(A) and FIG. 12(B) show other configurations of the transmission coil unit.

In FIG. 12(A), the capacitive element 332 is serially connected to the coil 331 and accordingly, a resonator for LC is formed. In the present example, the capacitive element 332 is connected to the positive output terminal 333, however, the capacitive element may be connected to the negative output terminal 334. In FIG. 12(B), a coil 341 and a capacitive element 342 are connected in parallel between the positive output terminal 343 and negative output terminal 344. In this way, a resonator for LC is formed. By combining configurations of FIG. 12(A) and FIG. 12(B), the capacitive element may be connected both in serial and parallel relative to the coil.

Further, in FIG. 1, one DC power supply 310 is commonly connected to the single-phase full-bridge inverters 120 and 220. However, the DC power supply may be connected separately for each single-phase full-bridge inverter.

Figure 13:
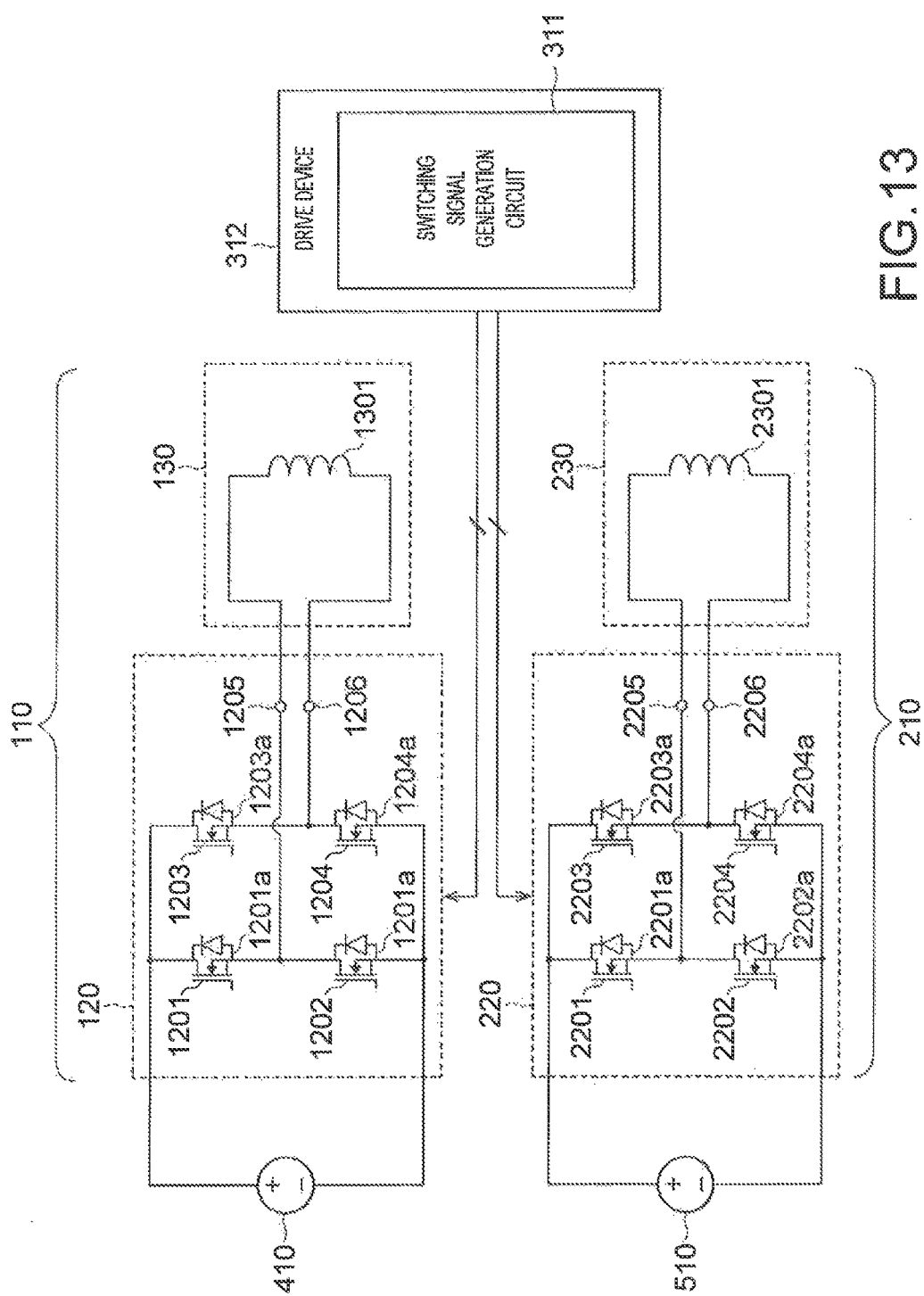
FIG. 13 shows a wireless power transmission device including a plurality of DC power supplies.

FIG. 13 shows a configuration example where DC power supply is connected separately for each single-phase full-bridge inverter. To the single-phase full-bridge inverter 120, a DC power supply 410, and to the single-phase full-bridge inverter 220, a DC power supply 510 is connected. In these cases, a part of the amplitude control for the output voltage of the single-phase full-bridge inverters 120 and 220 may be performed by amplitude adjustment of the output DC voltage of the DC power supply 410 and DC power supply 510, and a part of the remaining amplitude control by adjustment using the amplitude adjustment parameters $P_1$ and $P_2$ previously described. For example, in amplitude control of the output voltages of the DC power supplies 410 and 510, rough adjustment of amplitude may be performed by large variation unit (step width) and finer adjustment may be performed by adjustment using the amplitude adjustment parameters $P_1$ and $P_2$.

Figure 14:
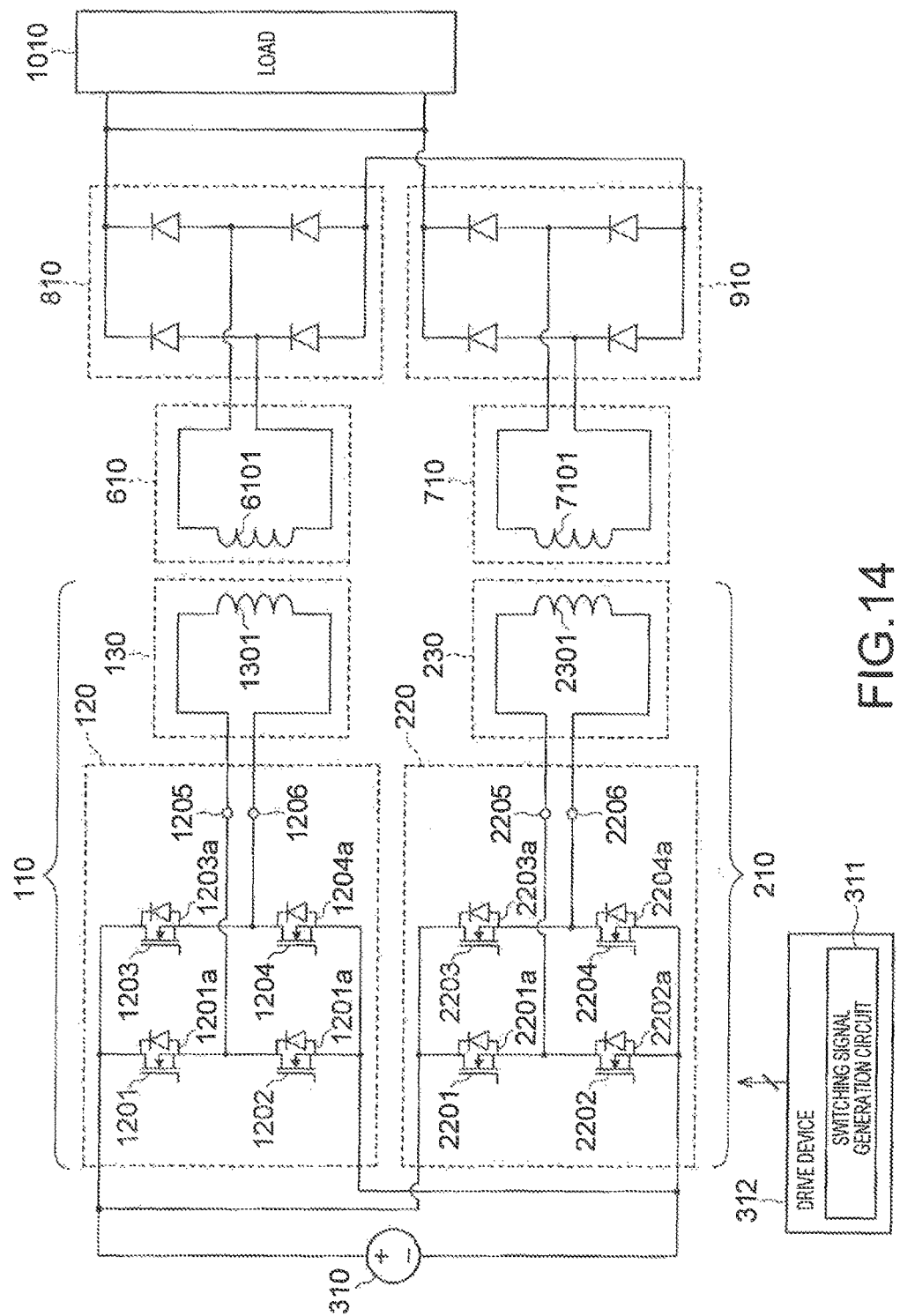
FIG. 14 shows another example of the wireless power transmission device according to the first embodiment.

FIG. 14 shows the power transmission device (a wireless power transmission device on the power-transmission side) illustrated in FIG. 1, and wireless power transmission device Including the power-reception device (wireless power transmission device on the power-reception side). The power-reception device includes two power reception coil units 610 and 710, rectifiers (AC/DC converters) 810 and 910, and a load 1010. The power reception coil units 610 and 710 include one coil, coil 6101 and coil 7101 respectively.

Through combining of the transmission coil unit 130 with power reception coil unit 610 and combining of the transmission coil unit 230 with power reception coil unit 710, power is wirelessly transmitted. The transmitted power is converted into direct current by the rectifiers 810 and 910, and supplied to the load 1010. The load 1010 is a device which consumes or stores the supplied direct-current power.

Figure 12:
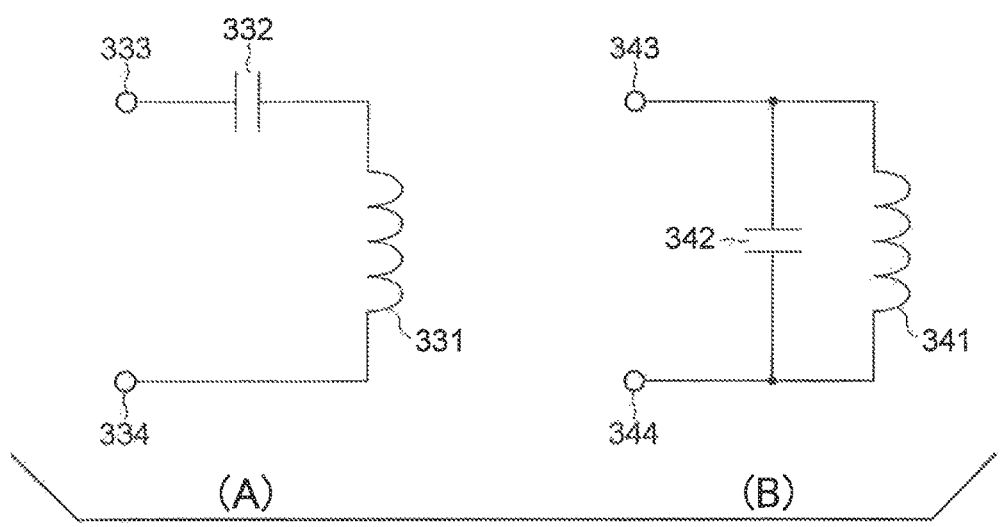
FIG. 12 shows an example of another transmission coil unit configuration.

The configuration of the power-reception device is not limited to the configuration shown in FIG. 14. For example, between the rectifier and the load 1010, a DC-DC converter may be further included. In addition, the load may be connected separately for each power reception coil unit instead of connecting commonly to the power reception coil units 610 and 710. The power reception coil unit is not limited to include only one coil, and various changes are possible as shown in FIG. 12 as in the transmission coil unit. Further, in the configuration shown in FIG. 14, the power transmitted from the two coils are received by corresponding two coils, however, there may be 1 or 3 or more coils on the power-reception side. For example, the configuration where the power transmitted from the two coils is received by one coil or 3 or more coils may be used.

As above, according to the present embodiment, by adjusting the phase of the switching signal driving the single-phase full-bridge inverter arranged corresponding to the transmission coil unit, voltage amplitude and voltage phase are individually adjusted for each transmission coil unit. In this way, even when characteristics and arrangement, etc. of the transmission coil units are not symmetrical, phase difference between the currents of the transmission coil units can be made to a particular relation (reversed phase), and also the amplitude of the current in each transmission coil unit can be controlled so as to mutually cancel out their leaked electromagnetic fields.

Second Embodiment

Figure 15:
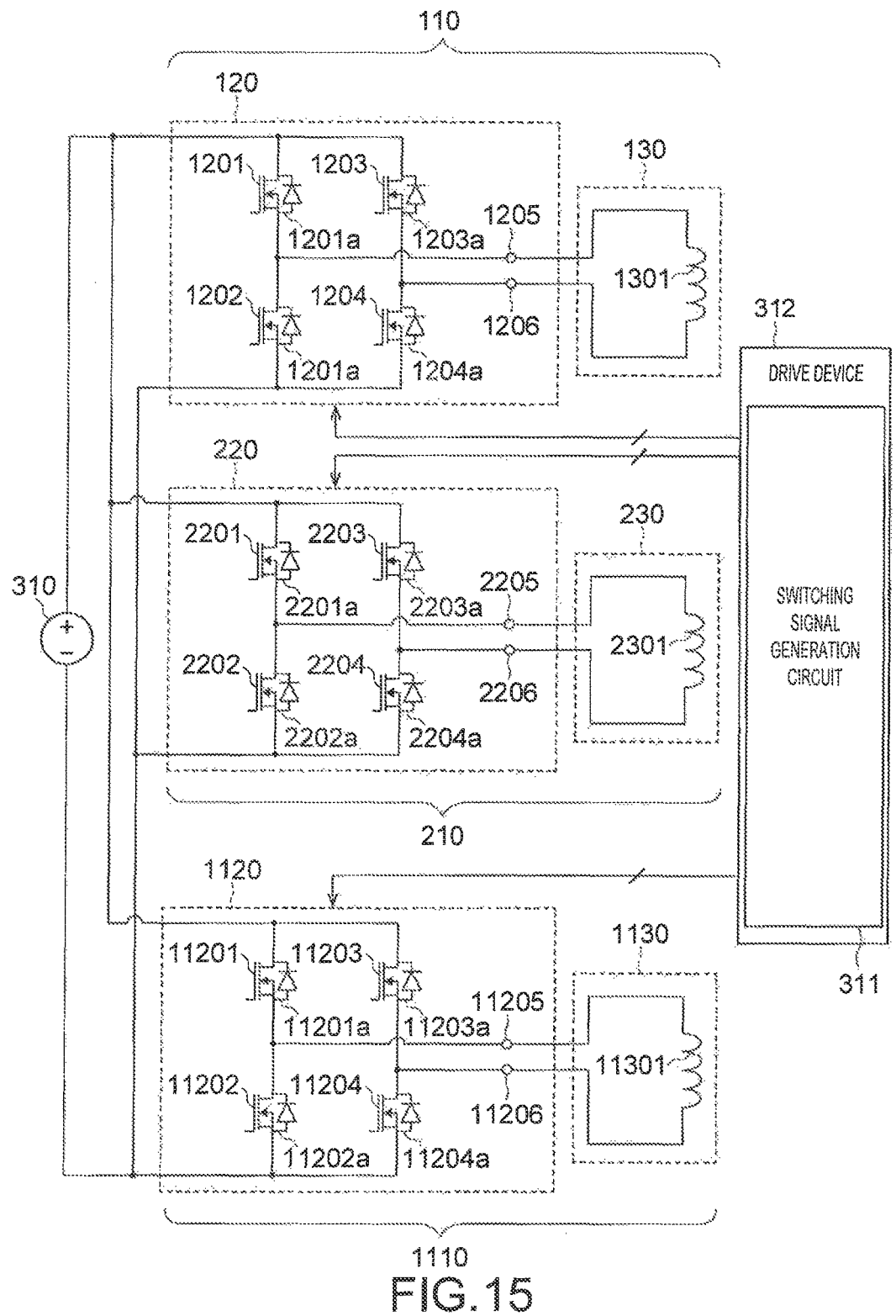
FIG. 15 shows an example of the wireless power transmission device according to the second embodiment.

FIG. 15 shows the wireless power transmission device according to the second embodiment. In the first embodiment shown in FIG. 1, there were two power-transmission units. However, in the present embodiment, the number of the power-transmission units are extended to 3. For elements having the same name as in FIG. 1, common symbols are assigned and except for those changed and extended processes, repeated explanations are omitted.

In addition to the power-transmission units 110 and 210, a power-transmission unit 1110 is added. The power-transmission unit 1110 includes a single-phase full-bridge inverter 1120 and a transmission coil unit 1130. The single-phase full-bridge inverter 1120 includes four switching elements 11201, 11202, 11203, and 11204, and diodes 11201a, 11202a, 11203a, and 11204a connected in inverse parallel to the switching elements respectively. Each of the switching elements 11201, 11202, 11203, and 11204 corresponds to the first, the second, the third, and the fourth switching elements respectively. The transmission coil unit 1130 includes a coil 11301. The single-phase full-bridge inverter 1120 and the transmission coil unit 1130 are connected via the terminals 11205 and 11206. The configuration of the single-phase full-bridge inverter 1120 is the same as the single-phase full-bridge inverter 120 or 220 so that its explanation is omitted.

Figure 16:
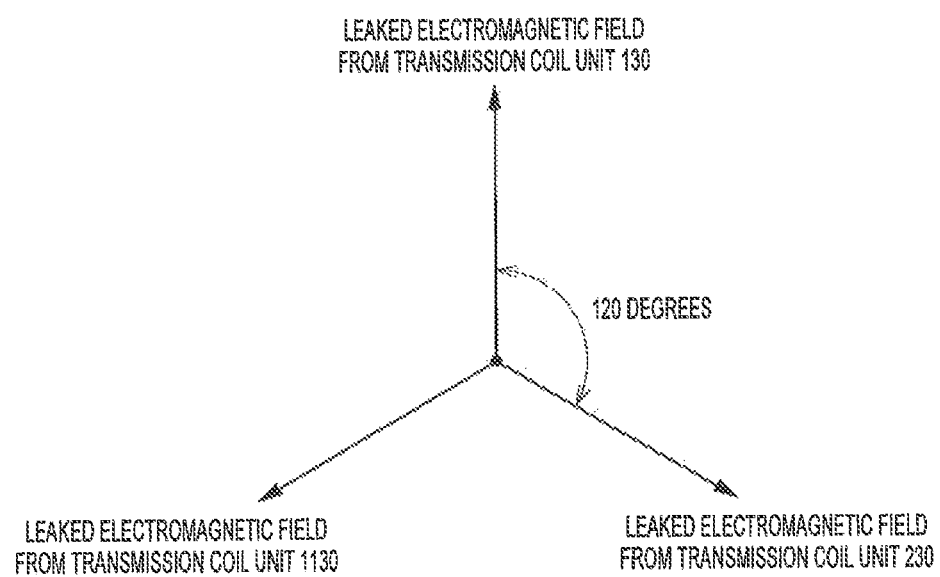
FIG. 16 describes the effect of reduction in an electromagnetic field for a case of three-phases.

When three power-transmission units are used, in order to obtain an effective effect in leaked electromagnetic field reduction, the current phase of each coil should be set so as to vary by 360/3=120 degrees. A vector diagram of the leaked electromagnetic fields after adjusting the phase relation as above, and also after adjusting the amplitudes of the leaked electromagnetic fields to match is shown in FIG. 16. As shown, a great reduction effect can be obtained even for the case of three phases.

To make the current phase of each transmission coil unit to vary by 120 degrees, the phase of the fundamental wave component of the output voltage of the single-phase full-bridge inverter 220 should be set so as to lead 120 degrees relative to the single-phase full-bridge inverter 120. This setting corresponds to setting $PP_1$=120 degrees in the first embodiment. In addition, the phase of the fundamental wave component of the output voltage of the single-phase full-bridge inverter 1120 should be set to lead 240 degrees relative to the single-phase full-bridge inverter 120. When the phase lead in the fundamental wave component of the output voltage of the single-phase full-bridge inverter 1120 relative to the single-phase full-bridge inverter 120 is expressed using the current phase adjustment parameter $PP_2$, this setting corresponds to setting $PP_2$ to 240 degrees. Here, the phase lead $Q_1$ relative to the voltage of the output current from the single-phase full-bridge inverter 120, phase lead $Q_2$ of the output current relative to the output voltage from the single-phase full-bridge inverter 220, and phase lead $Q_3$ of the output current relative to the output voltage from the single-phase full-bridge inverter 1120 are assumed to be substantially the same.

Figure 17:
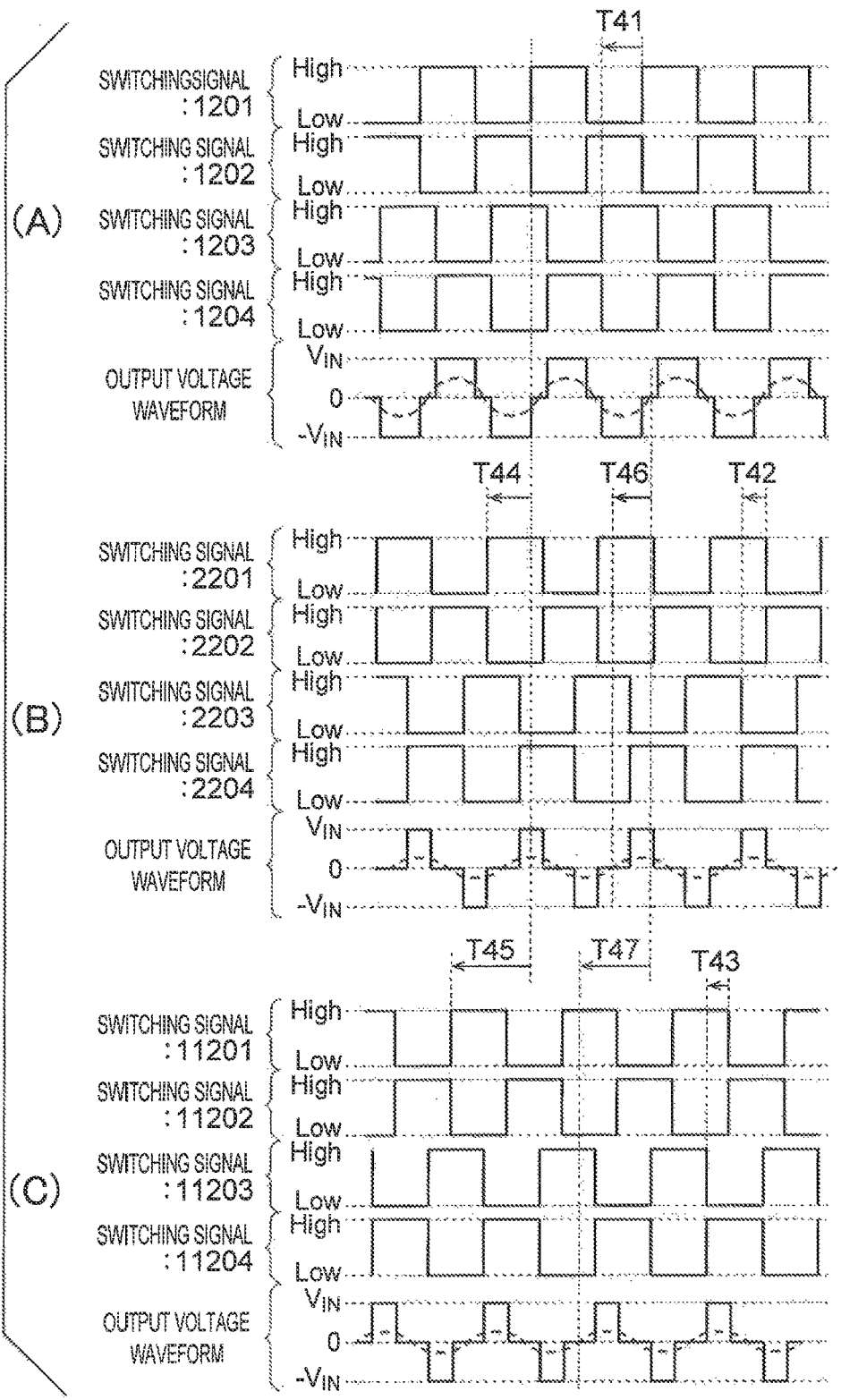
FIG. 17 shows an example of the switching signals and output waveform for a case of three-phases.

In FIG. 17, when $PP_1$ and $PP_2$ are set as above, an example of the waveform of the switching signal the switching signal generation circuit 311 provides to each single-phase full-bridge inverter is shown. Like those explained above, when the amplitude adjustment parameters are $P_1$, $P_2$, and $P_3$ ($P_1$, $P_2$, and $P_3$>0), the switching signal 1203 has the phase lead (T41) of "180–$P_1$" degrees relative to the switching signal 1202, the switching signal 2203 has the phase lead (T42) of "180–$P_2$" degrees relative to the switching signal 2201, and the switching signal 11203 has the phase lead (143) of "180–$P_3$" degrees relative to the switching signal 11201. The switching signal 2201 has the phase lead (T44) of "120–0.5($P_1$–$P_2$)" degrees relative to the switching signal 1201. $P_1$–$P_2$<0. Also, the switching signal 11201 has the phase lead (T45) of "240–0.5($P_1$–$P_3$)" degrees relative to the switching signal 1101. $P_1$–$P_3$<0. By setting as above, the fundamental wave component of the output voltage from the single-phase full-bridge inverter 220 possesses 120-degrees phase lead (T46) relative to the fundamental wave component of the output voltage from the single-phase full-bridge inverter 120, and the fundamental wave component of the output voltage from the single-phase full-bridge inverter 1120 possesses 240-degrees phase lead (T47) relative to the fundamental wave component of the output voltage from the single-phase full-bridge inverter 120.

Here, the case where the phase lead $Q_1$, $Q_2$, and $Q_3$ of the output current relative to the output voltage from each single-phase full-bridge inverter are assumed to be substantially the same. However, if their phase leads differ, as described in the first embodiment, the phase differences of the current should be adjusted so as to vary by 120 degrees taking into account the differences in these phase leads $Q_1$, $Q_2$, and $Q_3$. For example, the phase difference of the fundamental wave component of the voltage of the single-phase full-bridge inverter 220 relative to the fundamental wave component of the voltage of the single-phase full-bridge inverter 120 should be set to "120+$Q_1$–$Q_2$" degrees, and the phase difference of the fundamental wave component of the voltage of the single-phase full-bridge inverter 1120 relative to the fundamental wave component of the voltage of the single-phase full-bridge inverter 120 should be set to "240+$Q_1$–$Q_3$" degrees. $Q_1$<0, $Q_2$>0, $Q_3$>0. Here, adjustment of the phase difference (adjustment taking into account the variation of the above phase leads) relative to the fundamental wave component of the voltage is performed using the first single-phase full-bridge inverter 120 as the basis. However, the single-phase full-bridge inverter as the basis may be the second single-phase full-bridge inverter 220 or another single-phase full-bridge inverter.

In FIG. 15, a case with three power-transmission units are shown. However, in the present invention, more generally, the case can be extended to include "N" number (an integer of 2 or more) of power-transmission units. In such the case, the phase difference between the fundamental wave components of the output currents from the single-phase full-bridge inverters in the "M"th and "M–1"th power-transmission units should be adjusted to become "360×L/N" degrees. "M" is an integer of 2 or greater and N or less. "L" is an integer of 1 or greater and less than "N". In this way, the output current of the N-phase can be obtained and N-phase leaked electromagnetic fields are generated from the "N"th transmission coil units. However, by having these leaked electromagnetic fields canceled out each other, reduction of the leaked electromagnetic fields can be achieved. Further, when the phase leads relative to the voltage of the output current from each single-phase full-bridge inverter are the same, by adjusting the phase difference in the fundamental wave component of the output voltage to become "360×L/N" degrees, the phase difference in the fundamental wave component of the output current is adjusted to "360×L/N" degrees.

Figure 18:
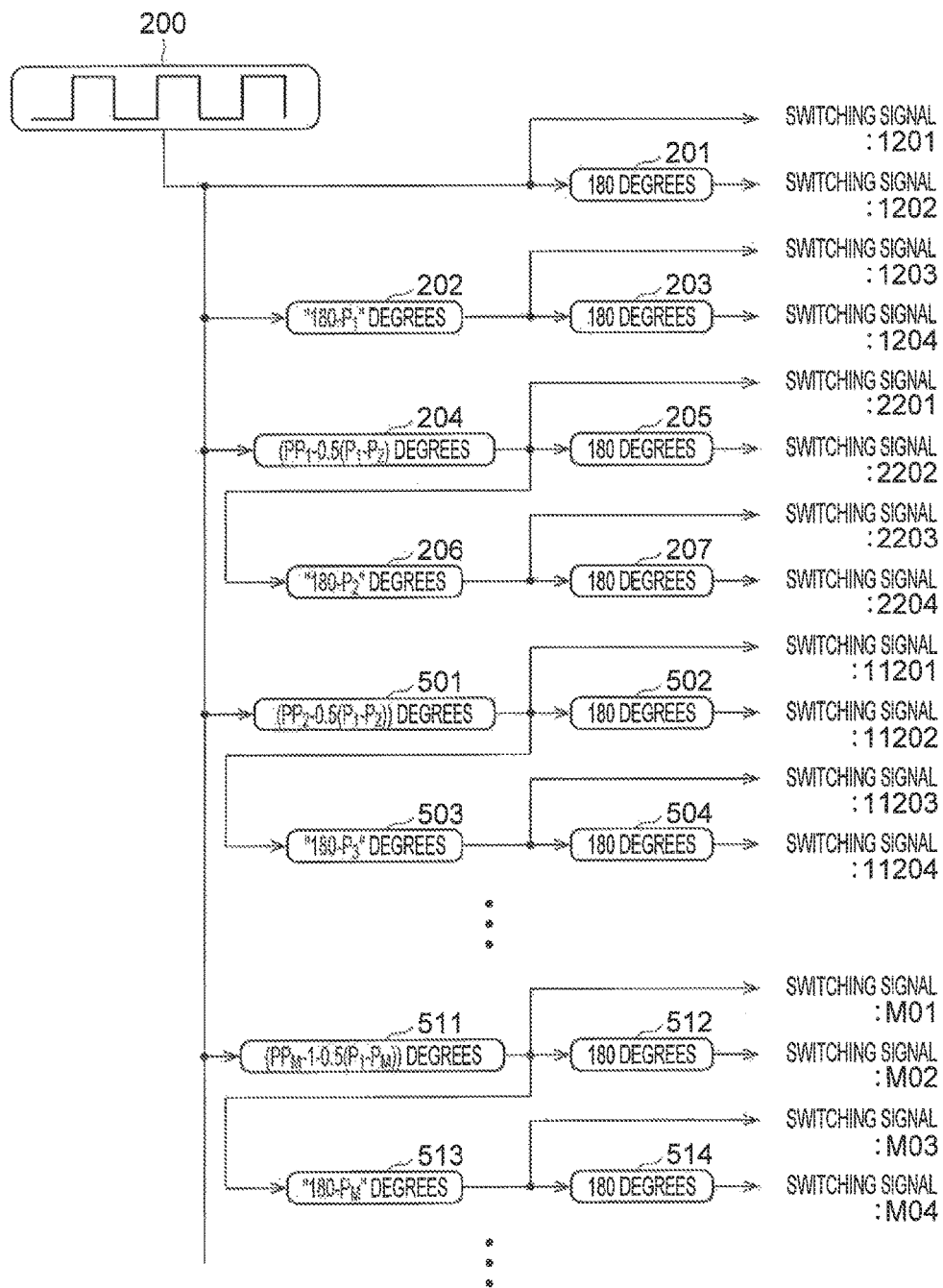
FIG. 18 shows an example of the switching signal generation circuit for the multiphase.

FIG. 18 shows a configuration example of the switching signal generation circuit 311 when "N" (integer of 2 or greater) number of power-transmission units are included. The configuration shown in FIG. 18 is obtained by extending the configuration shown in FIG. 9 to the "N" phase. The phase difference between the fundamental wave components of the "M"th single-phase full-bridge inverter and the single-phase full-bridge inverter 120 (the current phase adjustment parameter relative to the "M"th single-phase full-bridge inverter) is represented as "$PP_{M-1}$". Further, the amplitude adjustment parameter relative to the "M"th single-phase full-bridge inverter is represented as "$P_M$". Furthermore, like in FIG. 10 and FIG. 11, even for the case of N-phase, various configurations for generating the switching signal are possible. In the following, what differs from FIG. 9 is explained.

The switching signal 11201 relative to the switching element 11201 of the third single-phase full-bridge inverter 1120 (see FIG. 15) is generated by providing the phase lead of "$PP_2-0.5(P_1-P_2)$" degrees to the reference signal 200. The switching signal 11202 for the switching element 11202 is generated by providing 180-degrees phase lead to the switching signal 11201 by the phase shifter 502. The switching signal 11203 for the switching element 11203 is generated by providing the phase lead of "$180-P_3$" degrees to the switching signal 11201 by the phase shifter 503. The switching signal 11204 for the switching element 11204 is generated by providing 180-degrees phase lead to the switching signal 11203 by the phase shifter 504.

Further, the switching signal M01 for the first switching element of the "M"th single-phase full-bridge inverter is generated by providing the phase lead of "$PP_{M-1}-0.5(P_1-P_M)$" degrees to the reference signal 200 by the phase shifter 511. The switching signal M02 for the second switching element is generated by providing the 180-degrees phase lead to the switching signal M01 by the phase shifter 512. The switching signal M03 for the third switching element is generated by providing the phase lead of "$180-P_M$" degrees to the switching signal M01 by the phase shifter 513. The switching signal M04 for the fourth switching element is generated by providing 180-degrees phase lead to the switching signal M03 by the phase shifter 514.

As above, according to the present embodiment, even when the number of the power-transmission units is three or more, a similar effect as in the first embodiment can be obtained by appropriately setting the phase relation of the switching signal between respective single-phase full-bridge inverters.

Third Embodiment

Figure 19:
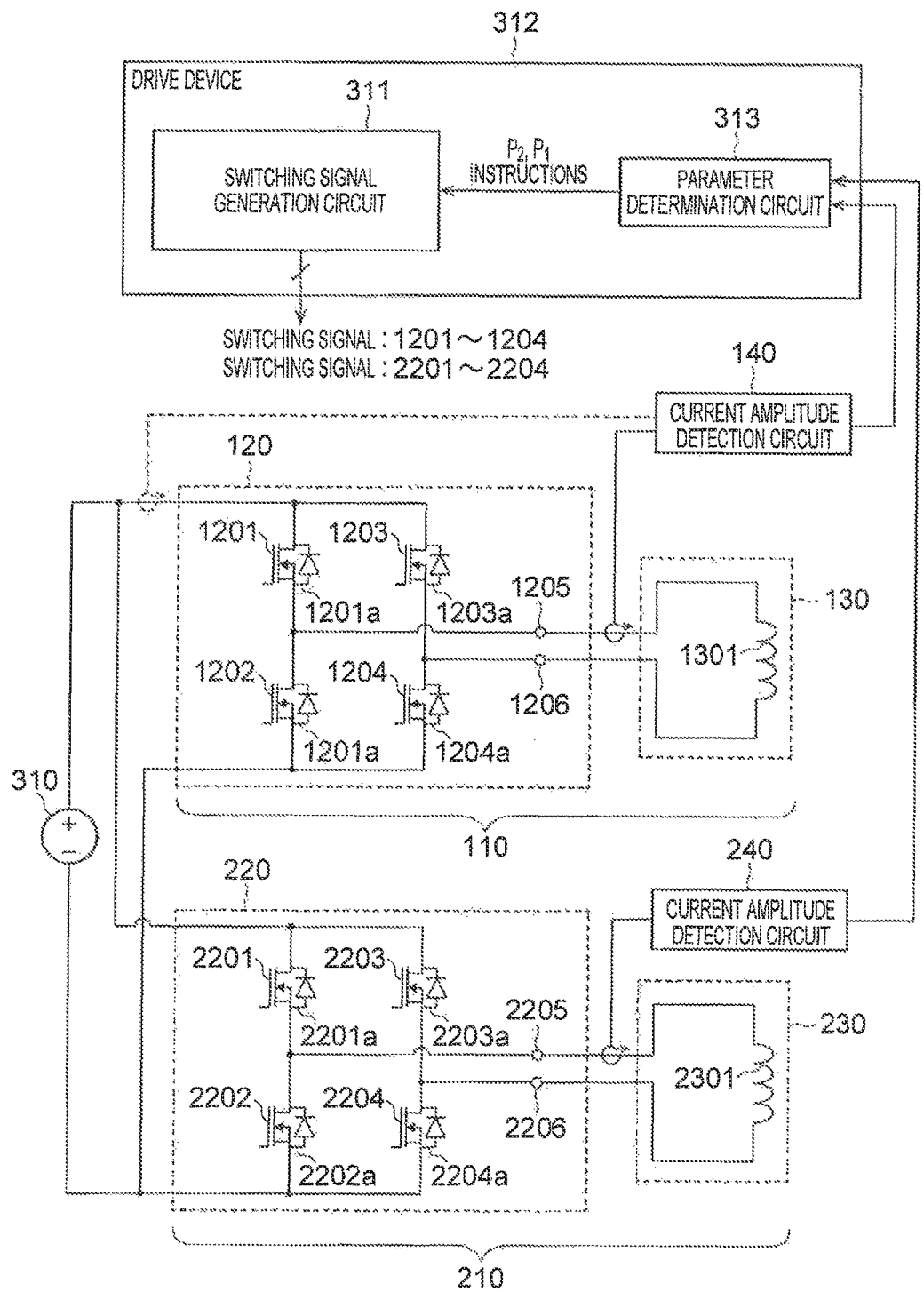
FIG. 19 shows an example of the wireless power transmission device according to the third embodiment.

FIG. 19 shows the wireless power transmission device according to the third embodiment.

FIG. 19 includes a current amplitude detection circuit 140 and a current amplitude detection circuit 240 in addition to the configuration in FIG. 1. Also, in addition to the switching signal generation circuit 311, the drive device 312 includes a parameter determination circuit 313 where an amplitude adjustment parameter is calculated.

The current amplitude detection circuit 140 detects the amplitude of the output current of the single-phase full-bridge inverter 120 and notifies the detected information indicating the amplitude to the drive device 312. The current amplitude detection circuit 240 detects the amplitude of the output current of the single-phase full-bridge inverter 220 and notifies the detected information indicating the amplitude to the drive device 312.

The parameter determination circuit 313 in the drive device 312 adjusts the values of the amplitude adjustment parameters $P_1$ and $P_2$ so as to make the amplitude differences in each output current small and for example, to make the difference to approach "0" based on the information obtained from the current amplitude detection circuits 140 and 240.

Specifically, when the amplitude of the output current from the single-phase full-bridge inverter 120 is larger than the output current amplitude of the single-phase full-bridge inverter 220, $P_1$ is changed to make $|P_1|$ larger in order to decrease the output current of the single-phase full-bridge inverter 120. Or, to increase the output current of the single-phase full-bridge inverter 220, $P_2$ is changed so as to make $|P_2|$ small. In this way, the difference in amplitude between currents can be made smaller.

The switching signal generation circuit 311, in accordance with the parameters $P_1$ and $P_2$ calculated by the parameter determination circuit 313, generates the switching signals 1201 to 1204 and 2201 to 2204 and supplies the switching signals to the single-phase full-bridge inverters 120 and 220. For the current phase difference adjustment parameter $PP_1$, a value provided in advance should be used. For example, when influence due to the difference between $Q_1$ and $Q_2$ of the single-phase full-bridge inverters 120 and 220 can be ignored, $PP_1$ should be set to 180 degrees.

In FIG. 19, although the output current of each single-phase full-bridge inverter was detected, similarly, an input current of each single-phase full-bridge inverter may be detected and controlled to match their amplitudes of the input current. In a typical configuration, there is enough correlation between an input current and output current, so that an object can be achieved even under this configuration. The configuration of the current amplitude detection circuits 140 and 240 when detecting the input current is shown in broken line in the figure.

Figure 20:
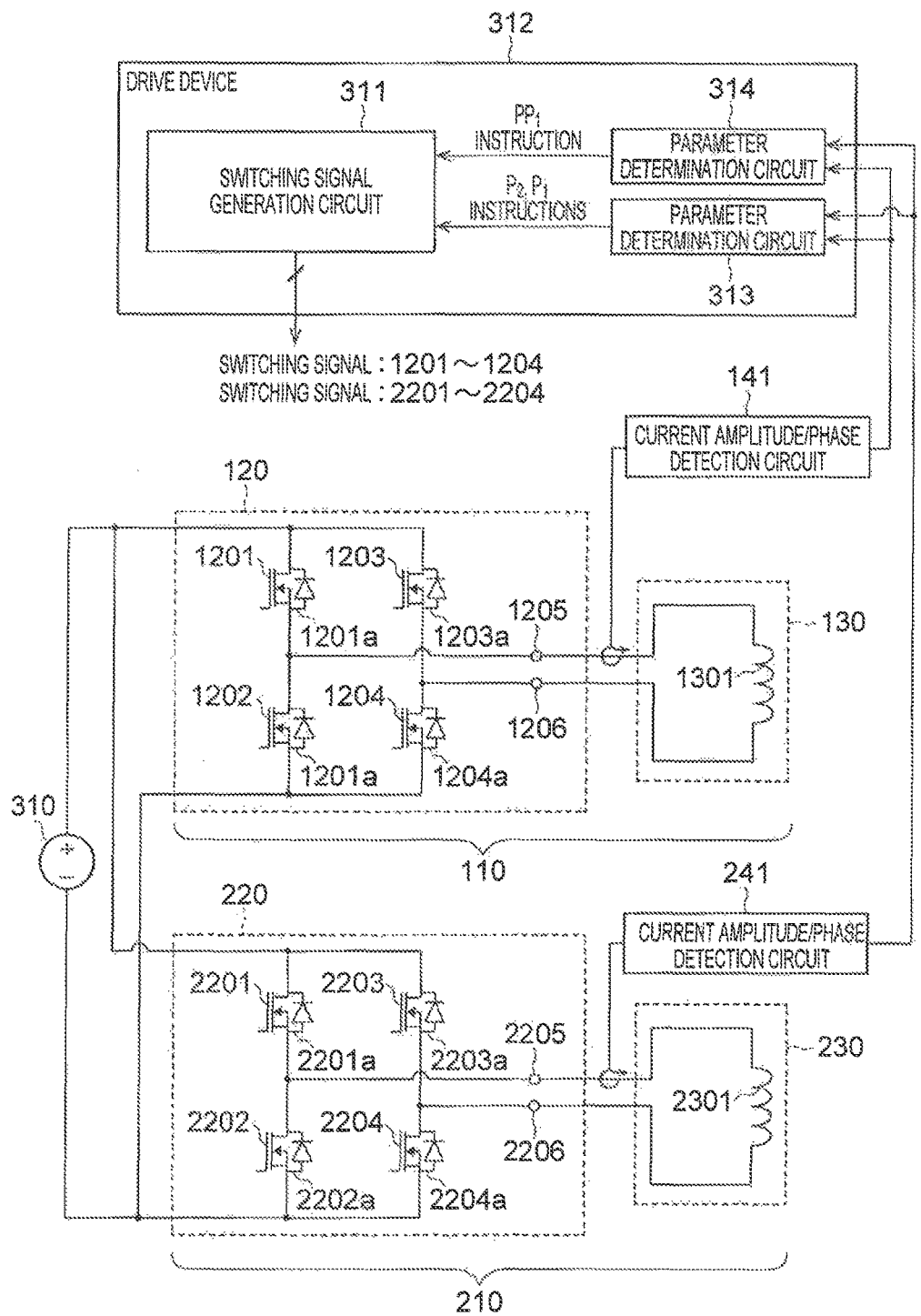
FIG. 20 shows another example of the wireless power transmission device according to the third embodiment.

FIG. 20 shows another example of the wireless power transmission device according to the third embodiment. The current amplitude detection circuits in FIG. 19 are replaced with the current amplitude/phase detection circuits 141 and 241. In addition, to the drive device 312, a parameter determination circuit 314 is added in addition to the parameter determination circuit 313.

The current amplitude/phase detection circuit 141 detects the amplitude and phase of the output current from the single-phase full-bridge inverter 120 and notifies the detected information representing the amplitude and phase to the drive device 312. The current amplitude/phase detection circuit 241 detects the amplitude and phase of the output current from the single-phase full-bridge inverter 220 and notifies the detected information representing the amplitude and phase to the drive device 312.

The parameter determination circuit 313, like in FIG. 19, adjusts the amplitude adjustment parameters $P_1$ and $P_2$ to make the amplitude differences of each output current small. Whereas, the parameter determination circuit 314 adjusts the current phase difference adjustment parameter $PP_1$ to make the detected phase difference approach 180 degrees.

The switching signal generation circuit 311 generates the switching signals 1201 to 1204 and 2201 to 2204 in accordance with the parameters $P_1$ and $P_2$ calculated by the parameter determination circuits 313 and 314, and supplies them to the single-phase full-bridge inverters 120 and 220.

In FIG. 19 and FIG. 20, when configurations of the transmission coil units 130 and 230 vary, the output current amplitude of each single-phase full-bridge inverter may be adjusted. For example, when the number of windings differs between the coil 1301 and coil 2301, the intensity of the generating electromagnetic fields can be made substantially the same by adjusting the current amplitudes to make the current amplitudes become the ratio that corresponds to the ratio of the number of windings.

Further, when the place where the leaked electromagnetic field is to be reduced and the positional relation of each transmission coil unit are known, each current amplitude may be adjusted according to the positional relation. For example, each current amplitude may be adjusted so as to become the ratio that corresponds to the ratio of the distances between the place and each of the transmission coil units 1 and 2.

In FIG. 19 and FIG. 20, the case of using two power-transmission units are shown, however, embodiment using 3 or more is possible.

The current amplitude detection circuit 140 and current amplitude detection circuit 240 shown in FIG. 19 and the current amplitude/phase detection circuit 141 and current amplitude/phase detection circuit 241 are disposed outside the drive device 312. However, these elements may be disposed inside the drive device 312.

All or a part of the parameter determination circuits 313 and 314 and switching signal generation circuit 311 shown in FIG. 19 and FIG. 20 may be achieved with hardware such as a processor, EPGA, and ASIC. When a processor is used, functions of such processing sections can be performed by the processor reading and executing the program stored in advance in a recording medium such as a memory and SSD.

As above, according to the present embodiment, by controlling the switching signals from each single-phase full-bridge inverter to make the amplitude differences between respective output currents small by detecting amplitude of the output current from each single-phase full-bridge inverter, the leaked electromagnetic fields can be reduced. In addition, by detecting the amplitude and phase of the output current from each single-phase full-bridge inverter to make the amplitude differences between respective output currents small, and by controlling the phase of the switching signal so as to make the phase difference of the current 180 degrees, the leaked electromagnetic fields can be reduced even when impedance characteristics in each transmission coil unit differs.

Fourth Embodiment

Figure 21:
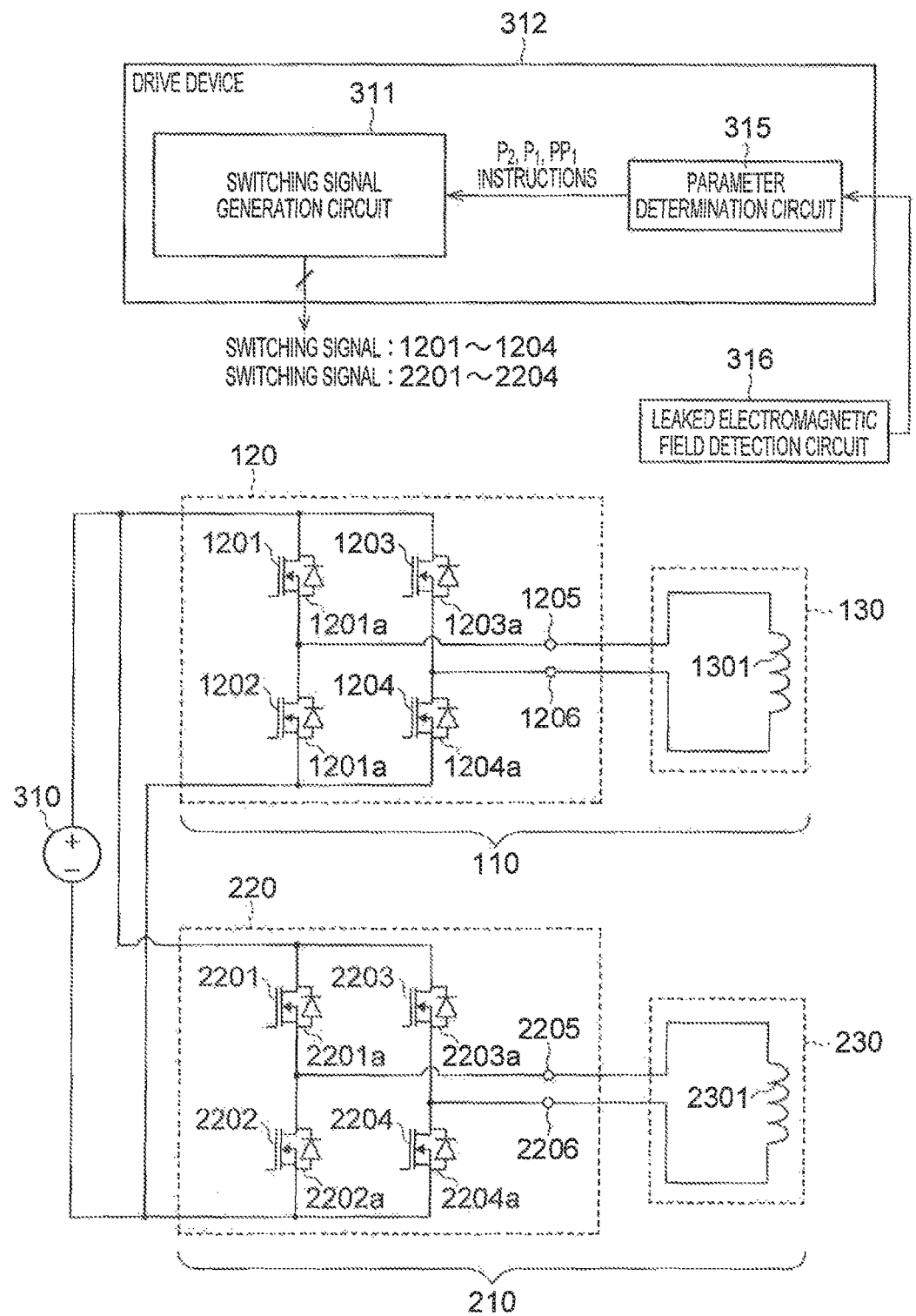
FIG. 21 shows an example of the wireless power transmission device according to the fourth embodiment.

FIG. 21 shows an example of the wireless power transmission device according to the fourth embodiment. The device in FIG. 21 detects a leaked electromagnetic field and in accordance with the intensity of the leaked magnetic field, adjusts the amplitude adjustment parameter and current phase adjustment parameter. The device in FIG. 21 includes, in addition to the configuration in FIG. 1, a leaked electromagnetic field detection circuit 316. Also, the drive device 312 includes a parameter determination circuit 315 in addition to the switching signal generation circuit 311.

The leaked electromagnetic field detection circuit 316 detects electromagnetic fields at predetermined places as the leaked electromagnetic field of the wireless power transmission device, and notifies the information representing the intensity of the detected leaked electromagnetic field to the drive device 312. The places for detecting the electromagnetic field may be inside the wireless power transmission device or outside the wireless power transmission device. In the latter case, the leaked electromagnetic field detection circuit 316 may be disposed apart from the wireless power transmission device. When doing so, by installing a wireless IF or wired IF to both of the leaked electromagnetic field detection circuit 316 and wireless power transmission device, the information representing the intensity of the detected electromagnetic field may be notified to the wireless power transmission device from the leaked electromagnetic field detection circuit 316 in the wireless or wired manner. In this example, the leaked electromagnetic field detection circuit 316 detected the electromagnetic field, however, a magnetic field, electric field, or both of these may be detected instead. Detecting the magnetic field or electric field also enables to find out the intensity of the leaked electromagnetic field.

Based on the information obtained from the leaked electromagnetic field detection circuit 316, the parameter determination circuit 315 adjusts the parameters $P_1$, $P_2$, and $PP_1$ so as to make the leaked electromagnetic field small. As for the change method, for example, one from the parameters $P_1$, $P_2$, and $PP_1$ is increased (or decreased) for a predetermined amount and the intensity of the leaked electromagnetic field before and after the change is compared. When the leaked electromagnetic field is decreased, the parameter is increased (or decreased) for the predetermined amount, and when the leaked electromagnetic field is increased, the parameter is decreased (or increased) for a predetermined amount. By repeating this change, each parameter can be adjusted to make the leaked electromagnetic field as small as possible. In contrast, by setting a threshold, the parameter adjustment may be repeated until the intensity of the leaked electromagnetic field becomes the threshold or below.

At this point, the parameter determination circuit 315 may temporarily set "0" to $PP_1$, that is, to set such that the leaked electromagnetic fields generated from each transmission coil unit become in phase, and set "0" for $PP_1$ when the intensity of the detected leaked electromagnetic field is the threshold or less. The threshold represents the upper limit of the acceptable leaked electromagnetic field intensity. When performing transmission such that the leaked electromagnetic fields become in phase, the electromagnetic fields generated from the two transmission coil units interfere to make them mutually stronger compared to the case where transmission is performed to make the leaked electromagnetic fields the opposite phases. Accordingly, an advantageous effect of transmitting a greater power with a small current can be expected.

Figure 22:
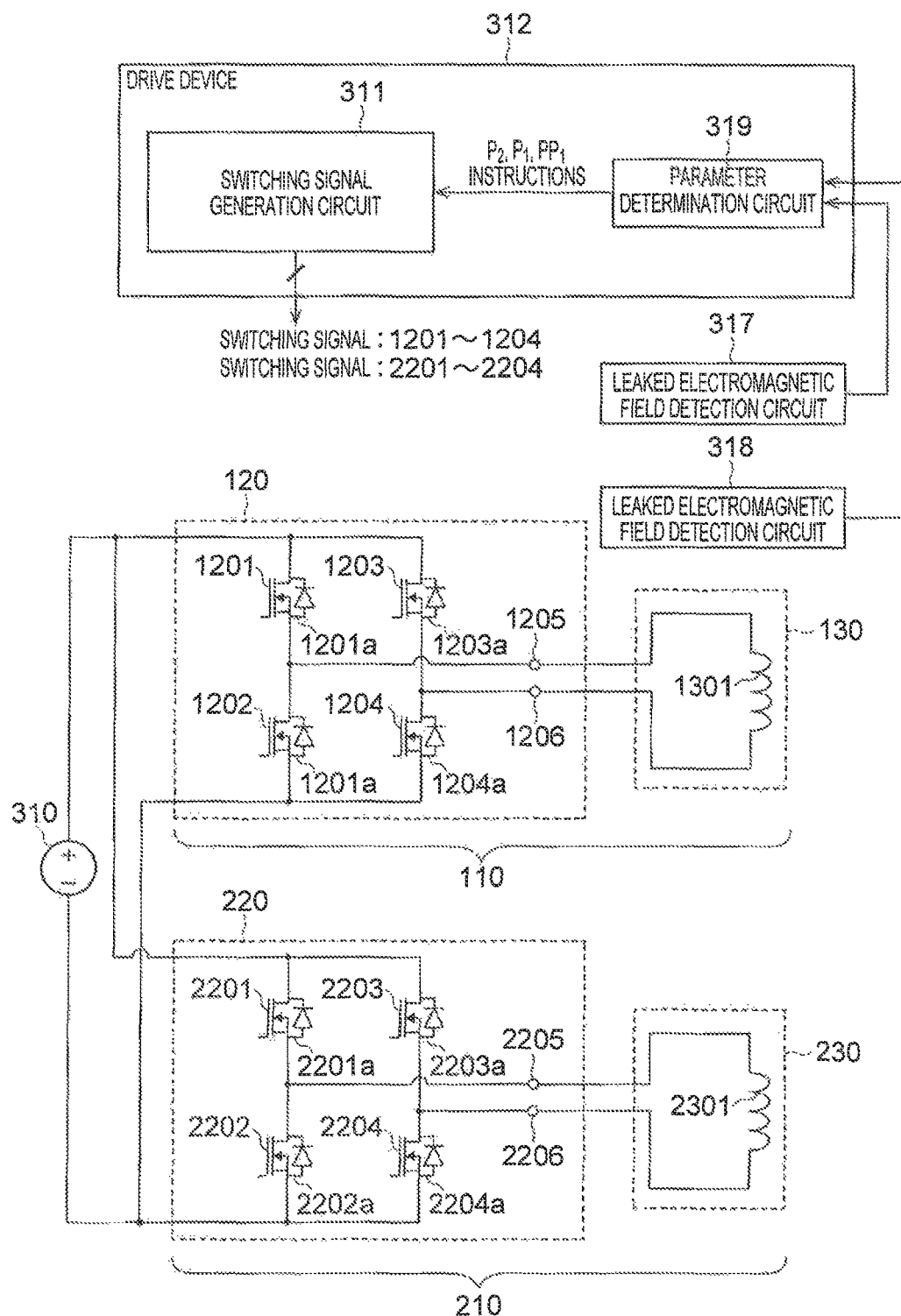
FIG. 22 shows another example of the wireless power transmission device according to the fourth embodiment.

FIG. 22 shows another example of, the wireless power transmission device according to the fourth embodiment. The leaked electromagnetic field detection circuit 316 in FIG. 21 is replaced with the leaked electromagnetic field detection circuits 317 and 318. Although the leaked electromagnetic field detection circuit 316 is arranged to the place where decrease of the leaked electromagnetic field is desired in FIG. 21, however, in FIG. 22, the leaked electromagnetic field detection circuits 317 and 318 are arranged at any place desired.

Each of the leaked electromagnetic field detection circuits 317 and 318 detects the leaked electromagnetic field in the place they were arranged, and notify the information representing the intensity of the detected leaked electromagnetic field to the drive device 312. Like in FIG. 19, the leaked electromagnetic field detection circuits 317 and 318 may be arranged inside the wireless power transmission device or outside the wireless power transmission device.

The parameter determination circuit 319 in the drive device 312, based on the information obtained from the leaked electromagnetic field detection circuits 317 and 318, adjusts the parameters $P_1$, $P_2$, and $PP_1$ so as to make the ratio of the intensity of each leaked electromagnetic field to become the predetermined value or approach the predetermined value. The predetermined value is determined based on the positional relation of the place where decrease of the leaked electromagnetic field is required and the locations of the leaked electromagnetic field detection circuits 317 and 318.

For example, when the leaked electromagnetic field detection circuits 317 and 318 are arranged proximally to the transmission coil unit 130 and transmission coil unit 230, adjust the parameter so as to make the ratio of the outputs from these two detection circuits "1". In this way, the amounts of the electromagnetic fields produced by these two transmission coil units become substantially the same. In such the case, at a point having the same distance from the two transmission coil units and at a point having enough distance relative to the coil size, leaked electromagnetic fields are mutually cancelled and a great reduction effect can be expected.

Although a case of using two transmission coil units is shown in FIG. 21 and FIG. 22, embodiments using three or more transmission coil units is also possible.

All or a part of the parameter determination circuits 315 and 319 and switching signal generation circuit 311 shown in FIG. 21 and FIG. 22 may be achieved with hardware such as a processor, EPGA, and ASIC. When a processor is used, functions of such processing sections can be performed by the processor reading and executing the program stored in advance in a recording medium such as a memory and SSD.

As above, according to the present embodiment by detecting a leaked electromagnetic field at a predetermined place and adjusting the amplitude adjustment parameters $P_1$ and $P_2$ and current phase difference adjustment parameter $PP_1$ to make the intensity of the detected leaked electromagnetic field small, the leaked electromagnetic field at the predetermined place can be decreased. Further, by detecting the leaked electromagnetic field at a plurality of places and adjusting the amplitude adjustment parameters $P_1$ and $P_2$ and current phase difference adjustment parameter $PP_1$ so as to make the ratio of intensities of the detected leaked electromagnetic fields a predetermined value, the leaked electromagnetic field of the desired place can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fail within the scope and spirit of the inventions.

The invention claimed is:

1. A drive device driving "N" number (N is an integer of "2" or greater) of inverters corresponding to transmission coil units, the inverters each including a first switching element and a second switching element connected together at respective one ends and a third switching element and a fourth switching element connected together at respective one ends, a connection node of the first and the second switching element being connected to one end of each corresponding transmission coil unit, a connection node of the third and the fourth switching element being connected to another end of each corresponding transmission coil unit, and the inverters each generating AC power by driving the first to fourth switching elements based on a first power-supply voltage supplied to other ends of the first and third switching elements and a second power-supply voltage supplied to other ends of the second and fourth switching elements, and outputting the AC power to each corresponding transmission coil unit, the drive device comprising:

a switching signal generation circuit configured to generate switching signals to drive the first to fourth switching elements of each inverter to complementarily drive the first switching element and the second switching element, and complementarily drive the third switching element and the fourth switching element so that a phase difference between an output current of an "M"th ("M" is an integer of 2 or greater and "N" or below) inverter and an output current of an "M−1"th inverter becomes or approach "360×L/N" degrees ("L" is an integer of "1" or greater and less than "N") and supply the switching signals to the first to fourth switching elements of the inverters.

2. The drive device according to claim 1, wherein each of the switching signals is a pulse signal having a same duty ratio and a same frequency.

3. The drive device according to claim 1, wherein a phase difference between a switching signal of the first switching element in the "M−1"th inverter and a switching signal of the third switching element in the "M−1"th inverter is "180−$P_{M-1}$" degrees, the phase difference between a switching signal of the first switching element in the "M"th inverter and a switching signal of the third switching element in the "M"th inverter is "180−$P_M$" degrees, and the drive device generates the switching signals so that the phase difference between the switching signal of the first switching element in the "M"th inverter and the switching signal of the first switching element in the "M−1"th inverter becomes or approach "$PP_{M-1}$−0.5 ($P_{M-1}$−$P_M$)" degrees, and the "$PP_{M-1}$" has a value based on the "360×L/N" degrees.

4. The drive device according to claim 3, wherein the "$PP_{M-1}$" has a value obtained by adjusting the "360×L/N" degrees in accordance with a phase lead of an output current relative to an output voltage of the M"th inverter and a phase lead of an output current relative to an output voltage of a reference inverter selected from the "N" number of inverters.

5. The drive device according to claim 3, further comprising:

a parameter determination circuit configured to acquire information representing a magnitude of an output current or an input current of each inverter from a detection circuit detecting the magnitude of the output current or the input current of each inverter and adjust $P_1$ to $P_N$ so that a difference in magnitude between output currents or input currents of the respective inverters becomes small.

6. The drive device according to claim 3, further comprising:

a parameter determination circuit configured to obtain information representing a phase of an output current of each inverter from a detection circuit detecting the phase of the output current of each inverter, and to adjust, based on the information obtained from the detection circuit, "$PP_1$ to $PP_{N-1}$" so that a phase difference between an output current of the "M"th inverter and an output current of the "M−1"th inverter becomes or approach the "360×L/N" degrees.

7. The drive device according to claim 3, further comprising:
a parameter determination circuit configured to acquire, from a detection circuit detecting an electric field, magnetic field, or electromagnetic field in a place apart from each transmission coil unit, information representing an intensity of an electric field, magnetic field, or electromagnetic field in the place and adjust at least one of the $PP_{M-1}$, the $P_{M-1}$, or the $P_M$ based on the acquired information.

8. The drive device according to claim 3, further comprising:
a parameter determination circuit configured to acquire, from a plurality of detection circuits detecting an electric field, magnetic field, or electromagnetic field in different places apart from each transmission coil unit, information representing an intensity of an electric field, magnetic field, or electromagnetic field in each of the places and adjust at least one of the $PP_{M-1}$, the $P_{M-1}$, or the $P_M$ based on a relation of respective information for the places.

9. The drive device according to claim 3, further comprising:
a parameter determination circuit configured to acquire, from a detection circuit detecting an electric field, magnetic field, or electromagnetic field in a place apart from each transmission coil unit, information representing an intensity of the electric field, magnetic field, or electromagnetic field in the place, and set $PP_{M-1}$ to "0" in a case where a value of the information obtained from the detection circuit is a threshold or less with the "$PP_{M-1}$" tentatively set to "0".

10. The drive device according to claim 1, wherein the first power-supply voltage and the second power-supply voltage are commonly provided to the "N" number of inverters from a same DC power supply.

11. The drive device according to claim 1, wherein a value of "L" is "1".

12. The drive device according to claim 1, wherein a value of "N" is either "2" or "3".

13. A wireless power transmission device comprising:
a drive device according to claim 1;
"N" number of inverters; and
"N" number of transmission coil units to receive AC power supply from the "N" number of inverters.

14. A driving method of driving "N" number (N is an integer of "2" or greater) of inverters corresponding to transmission coil units,
the inverters each including a first switching element and a second switching element connected together at respective one ends and a third switching element and a fourth switching element connected together at respective one ends, a connection node of the first and the second switching element being connected to one end of each corresponding transmission coil unit, a connection node of the third and the fourth switching element being connected to another end of each corresponding transmission coil unit, and
the inverters each generating AC power by driving the first to fourth switching elements based on a first power-supply voltage supplied to other ends of the first and third switching elements and a second power-supply voltage supplied to other ends of the second and fourth switching elements, and outputting the AC power to each corresponding transmission coil unit,
the method comprising:
generating switching signals to drive the first to fourth switching elements of each inverter to complementarily drive the first switching element and the second switching element, and complementarily drive the third switching element and the fourth switching element so that a phase difference between an output current of an "M"th ("M" is an integer of 2 or greater and "N" or below) inverter and an output current of an "M−1"th inverter becomes or approach "360×L/N" degrees ("L" is an integer of "1" or greater and less than "N"), each of the switching signals being a pulse signal having a same duty ratio and a same frequency and
supplying the switching signals to the first to fourth switching elements of the inverters.

15. The drive device according to claim 3, wherein the $P_M$ is not same for all "M" values.

16. The drive device according to claim 4, further comprising:
a parameter determination circuit configured to obtain information representing a phase of an output current of each inverter from a detection circuit detecting the phase of the output current of each inverter, and to adjust, based on the information obtained from the detection circuit, "$PP_1$ to $PP_{N-1}$" so that a phase difference between an output current of the "M"th inverter and an output current of the "M−1"th inverter becomes or approach the "360×L/N" degrees.

17. The drive device according to claim 5, further comprising:
a parameter determination circuit configured to obtain information representing a phase of an output current of each inverter from a detection circuit detecting the phase of the output current of each inverter, and to adjust, based on the information obtained from the detection circuit, "PP1 to PPN-1" so that a phase difference between an output current of the "M"th inverter and an output current of the "M−1"th inverter becomes or approach the "360×L/N" degrees.

* * * * *